United States Patent
Mheen et al.

(10) Patent No.: US 9,857,472 B2
(45) Date of Patent: Jan. 2, 2018

(54) LASER RADAR SYSTEM FOR OBTAINING A 3D IMAGE

(71) Applicant: Electronics and Telecommunications Research Institute, Daejeon (KR)

(72) Inventors: Bongki Mheen, Daejeon (KR); Myoungsook Oh, Daejeon (KR); Jae-Sik Sim, Daejeon (KR); Jung-Ho Song, Daejeon (KR); Hong-Seok Seo, Daejeon (KR); Minhyup Song, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 9 days.

(21) Appl. No.: 14/321,649

(22) Filed: Jul. 1, 2014

(65) Prior Publication Data
US 2015/0009485 A1    Jan. 8, 2015

(30) Foreign Application Priority Data

Jul. 2, 2013 (KR) .................. 10-2013-0076995
Jun. 30, 2014 (KR) .................. 10-2014-0080444

(51) Int. Cl.
| | | |
|---|---|---|
| *G01C 3/08* | (2006.01) | |
| *G01S 17/93* | (2006.01) | |
| *G01S 7/481* | (2006.01) | |
| *G01S 17/89* | (2006.01) | |
| *G01S 17/87* | (2006.01) | |

(52) U.S. Cl.
CPC .......... *G01S 17/936* (2013.01); *G01S 7/4817* (2013.01); *G01S 17/87* (2013.01); *G01S 17/89* (2013.01)

(58) Field of Classification Search
CPC ........ G01S 17/89; G01S 17/87; G01S 7/4817; G01S 17/936
See application file for complete search history.

(56) References Cited

U.S. PATENT DOCUMENTS 5,793,491 A * 8/1998 Wangler et al. .............. 356/613
6,414,746 B1 7/2002 Stettner et al.
(Continued)

FOREIGN PATENT DOCUMENTS

DE 102007054596 A1 5/2009
DE 102009007054 A1 8/2010

OTHER PUBLICATIONS

Mitsuhito Mase et al., "A wide dynamic range CMOS image sensor with multiple exposure-time signal outputs and 12-bit column-parallel cyclic A/D converters" IEEE Journal of Solid-State Circuits, vol. 12, No. 12, pp. 2787-2795, Dec. 2005.

*Primary Examiner* — Samantha K Abraham
(74) *Attorney, Agent, or Firm* — Rabin & Berdo, P.C.

(57) ABSTRACT

Provided is a laser radar system. The laser radar system includes a first transmission and reception unit sequentially radiating a first laser beam to a plurality of locations within a first view range and receiving a reflected light; and a second transmission and reception unit sequentially radiating a second laser beam to a plurality of locations within a second view range and receiving a reflected light, wherein each of the first transmission and reception unit and the second transmission and reception unit is fixed to a loader and independently searches for the first view range and the second view range.

20 Claims, 18 Drawing Sheets

(56) References Cited

U.S. PATENT DOCUMENTS

| | | | |
|---|---|---|---|
| 7,544,945 B2 * | 6/2009 | Tan | G01S 7/4811 |
| | | | 180/169 |
| 7,969,558 B2 | 6/2011 | Hall | |
| 8,072,581 B1 * | 12/2011 | Breiholz | 356/5.01 |
| 2008/0059015 A1 * | 3/2008 | Whittaker | G05D 1/027 |
| | | | 701/23 |
| 2009/0201486 A1 * | 8/2009 | Cramblitt | G01S 7/4811 |
| | | | 356/4.01 |
| 2009/0254260 A1 * | 10/2009 | Nix | B60W 30/16 |
| | | | 701/96 |
| 2011/0188029 A1 * | 8/2011 | Schmitt et al. | 356/28 |
| 2011/0216304 A1 | 9/2011 | Hall | |
| 2013/0103298 A1 * | 4/2013 | Becker et al. | 701/300 |
| 2014/0049429 A1 * | 2/2014 | Bruemmer | G01S 5/0289 |
| | | | 342/463 |

* cited by examiner

US 9,857,472 B2

LASER RADAR SYSTEM FOR OBTAINING A 3D IMAGE

CROSS-REFERENCE TO RELATED APPLICATIONS

This U.S. non-provisional patent application claims priority under 35 U.S.C. §119 of Korean Patent Application Nos. 10-2013-0076995, filed on Jul. 2, 2013, and 10-2014-0080444, filed on Jun. 30, 2014, the entire contents of which are hereby incorporated by reference.

BACKGROUND OF THE INVENTION

The present invention disclosed herein relates to a laser radar, and more particularly, to a laser radar system for obtaining a 3D image.

A 3D image system is used for obtaining image content displayed by a 3D display TV. In addition, the 3D image system may be used for monitoring a long-distance military target or a natural environment such as landslide and for obtaining various 3D images around a car needed for the operation of a manless car.

Even a 3D image having a poor quality may play a role in some regions but with the recent sharp expansion of an application region, various environments need a 3D image having an excellent quality. In order to implement a high-quality 3D image, a laser radar system recently takes center stage.

However, in order to obtain a 3D image having a high resolution or frame rate, it is true that a laser radar system involving a high manufacturing cost is needed. The present invention provides a laser radar system that may change a search scope at a low cost and easily change a desired resolution or frame rate.

SUMMARY OF THE INVENTION

The present invention provides a laser radar system that may minimize an effort such as optical path alignment between a light transmitting path and a light receiving path for obtaining optimal performance needed when obtaining a 3D image, decrease total implementation cost and be suitable for mass production.

The present invention also provides a laser radar system that relatively easily removes or decreases a dead zone not detected, when being installed at a car.

The present invention also provides a laser radar system that may operate on a target with a wide area or angle.

The present invention also provides a laser radar system that may set up different image data resolutions for regions.

The present invention also provides a 3D image by simultaneously and comprehensively analyzing long-distance data providing a high SNR mode for a narrow angle and short-distance data providing a low SNR mode for a wide angle. The present invention also provides a laser radar system that may obtain long-distance data on a region of interest and wide-range data on other regions by using a method of selectively operating some simultaneously or depending on the situation and a method of obtaining an image of a target by the system.

Embodiments of the present invention provide laser radar systems including a first transmission and reception unit sequentially radiating a first laser beam to a plurality of locations within a first view range and receiving a reflected light; and a second transmission and reception unit sequentially radiating a second laser beam to a plurality of locations within a second view range and receiving a reflected light, wherein each of the first transmission and reception unit and the second transmission and reception unit is fixed to a loader and independently searches for the first view range and the second view range.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings:

FIG. 17 is a cross sectional view of sections taken along line B-B' of

FIG. 16;

DETAILED DESCRIPTION OF PREFERRED EMBODIMENTS

The above general descriptions and the following detailed descriptions all are exemplary for providing additional descriptions on the present invention. However, the present invention is not limited embodiments to be described below but may be implemented in other forms. Rather, these embodiments are provided so that the present disclosure will be thorough and complete, and will fully convey the scope of the present invention to a person skilled in the art.

The terms used herein are just used to describe specific embodiments and not intended to limit the present invention. The terms in singular form include the plural form unless otherwise specified. It should be understood that the terms "includes" or "has" indicate the presence of characteristics, numbers, steps, operations, components, parts or combinations thereof represented in the present disclosure but do not exclude the presence or addition of one or more other characteristics, numbers, steps, operations, components, parts or combinations thereof.

Unless otherwise defined herein, all terms used herein including technical or scientific terms have the same meanings as those generally understood by a person skilled in the art. Terms defined in generally used dictionaries should be construed to have meanings matching with contextual meanings in the related art and are not construed as an ideal or excessively formal meaning unless otherwise defined herein.

When the present disclosure mentions that any part includes any component, it means that it is also possible to further include other components. Also, each embodiment described and illustrated herein includes its complementary embodiment. Embodiments of the present invention are described below in detail with reference to the accompanying drawings.

Exemplary embodiments of the present invention are described below in detail with reference to the accompanying drawings. It should be noted that only descriptions required for understanding operations according to the present invention are provided below and other descriptions are not provided in order not to obscure the subject matter of the present invention.

Figure 1:
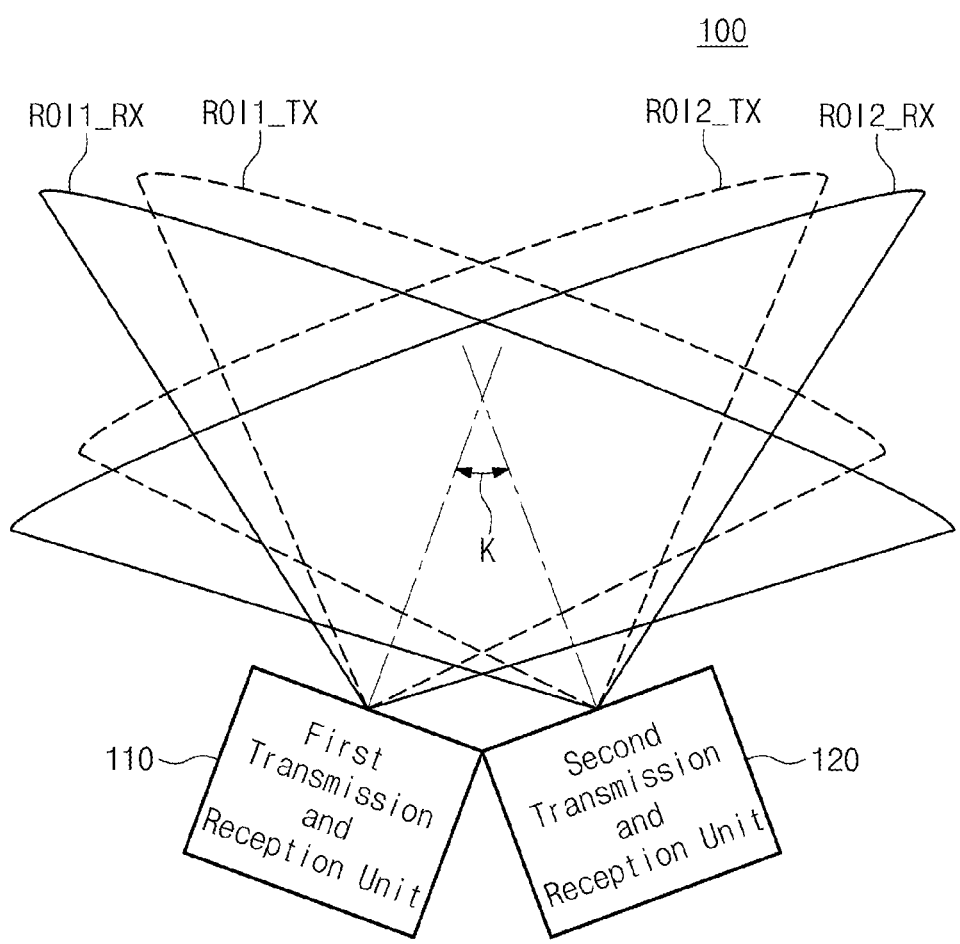
FIG. 1 shows a laser radar system according to an embodiment of the present invention.

FIG. 1 shows a laser radar system according to an embodiment of the present invention. Referring to FIG. 1, a laser radar system 100 of the present invention includes a first transmission and reception unit 110 and a second transmission and reception unit 120 that have different view ranges or regions of interest ROIs.

The first transmission and reception unit 110 sequentially radiates a laser beam over time. A light transmission unit (not shown) included in the first transmission and reception unit 110 radiates a laser pulse in a direction corresponding to a first transmission view range ROI1_TX. That is, the first transmission and reception unit 110 will sequentially radiate a laser pulse for sequentially scanning a radiation field included in the first transmission view range ROI1_TX, horizontally or vertically.

The first transmission and reception unit 110 receives a reflected laser light which is radiated from the light transmission unit and a target reflects. The first transmission and reception unit 110 will include a light reception unit (not shown) receiving reflected light from a region corresponding to a first reception view range ROI1_RX. In particular, the light reception unit may also include a wide-area photo detector for detecting reflected laser light that sequentially enters. However, it will be easily understood that the type of a photo detector configuring the light reception unit is not limited thereto and may include a single photo detector, a split-type photo detector or an array-type photo detector. The first transmission and reception unit 110 may configure a 3D image of a region corresponding to the first reception view range ROI1_RX with reference to the reflection time or intensity of reflected light detected from a wide-area photo detector. In this example, the first reception view range ROI1_RX may be set to be relatively wider than the first transmission view range ROI1_TX. The configuration of the first transmission and reception unit 110 will be described below in more detail with reference to other drawings.

The second transmission and reception unit 120 scans and detects view ranges ROI2_TX and ROI2_RX different from those of the first transmission and reception unit 110. The second transmission and reception unit 120 will particularly radiate a laser beam to the second transmission view range ROI2_TX at a different time from the first transmission and reception unit 110. In addition, the second transmission and reception unit 120 will receive and detect reflected laser light from a region corresponding to the second reception view range ROI2_RX. The second transmission and reception unit 120 radiates a laser beam to a region corresponding to the second transmission view range ROI2_TX sequentially over time. The configuration of the second transmission and reception unit 120 may be the same as that of the first transmission and reception unit 110.

The first and second transmission and reception units 110 and 120 may be installed at a loader in a fixed direction. For example, they may be installed at the loader so that the difference between the central parts of the view ranges of the first and second transmission and reception units 110 and 120 has a fixed angle K. The reason for this is because each of the first and second transmission and reception units 110 and 120 includes a transmission unit and a wide-area photo detector that may detect a 3D image having a high resolution without rotation. Such a structure will be described in detail in FIGS. 2 to 4. In addition, the first transmission view range ROI1TX or the second transmission view range ROI2_TX may be formed in a horizontally asymmetrical shape on the loader. In addition, the first transmission view range ROI1_TX or the second transmission view range ROI2_TX may be formed in a sectorial shape on the loader but may also be formed in a non-circular shape. That is, by relatively increasing or decreasing the power of a pulse laser at a specific angle, the shape of the first transmission view range ROI1TX or the second transmission view range ROI2_TX becomes non-circular on the loader.

In addition, although it is described that the laser radar system 100 includes the first and second transmission and reception units 110 and 120 radiating a laser beam at different time slots, the present invention is not limited thereto. A third transmission and reception unit radiating a laser beam and detecting reflected light at different time slots from the first and second transmission and reception units 110 and 120 may be further included. In addition, the transmission and reception view ranges of the third transmission and reception unit may be formed to or not to overlap the transmission and reception view ranges of the first and second transmission and reception units 110 and 120. In order to remove a dead zone in detection, the transmission and reception view ranges of the first to third transmission and reception units may overlap.

Moreover, the laser radar system 100 may further include a control unit (not shown) for forming a 3D image with reference to the detection signal of each of the first and second transmission and reception units 110 and 120. The control unit may synthesize a 3D image coordinate or reflected image information with reference to the detection signals of reflected lights corresponding respectively to reception view ranges ROI1_RX and ROI2_RX, detected reflection times or the intensities of reflected lights. In addition, the control unit may also variably control at least one of the first transmission view range ROI1_TX or the second transmission view range ROI2_TX, a scan speed, the number of points to be scanned, and laser power, based on the moving direction, moving angle, moving speed of the loader, moving information, information on weather around the loader, dust, and the locations of the first and second transmission and reception units 110 and 120 on the loader.

Figure 2:
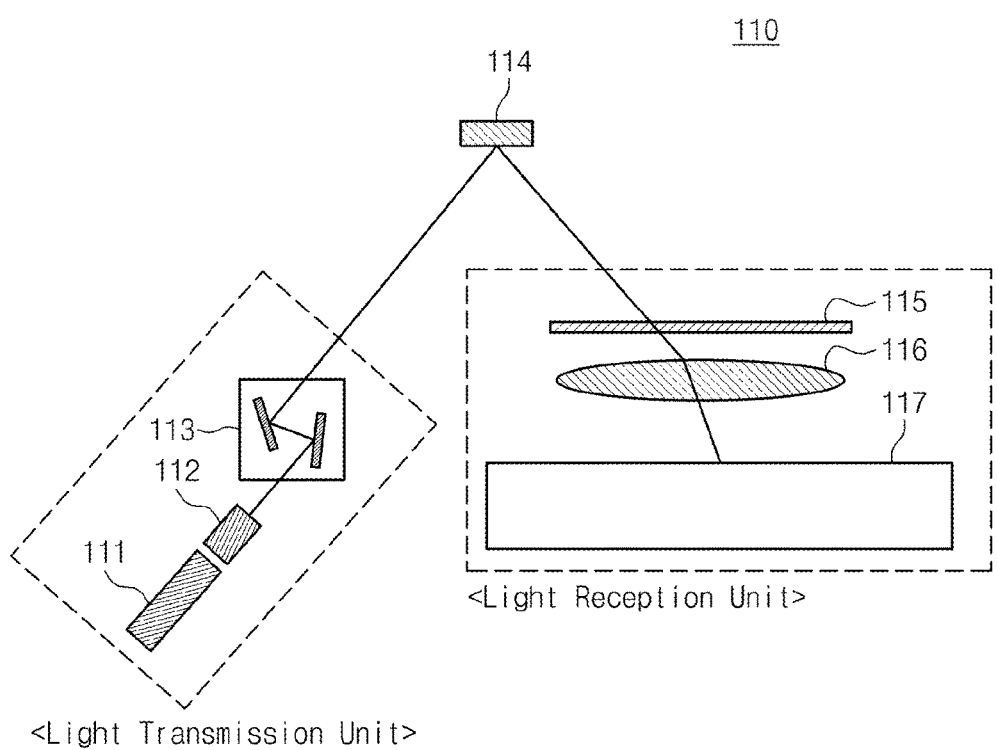
FIG. 2 exemplarily shows a transmission and reception unit configuring a laser radar system according to the present invention.

FIG. 2 exemplarily shows a transmission and reception unit configuring a laser radar system according to the present invention. Referring to FIG. 2, the first transmission and reception unit 110 may include a light transmission unit and a light reception unit. In this example, although only the first transmission and reception unit 110 is generally described, the second transmission and reception unit 120 may also be equally configured. Thus, a description of a particular structure of the second transmission and reception unit 120 is not provided.

A laser pulse output from a pulse laser generator 111 is transmitted to a light-transmission optical system 112. Light emitted from the light-transmission optical system 112 is radiated, through an optical deflector 113, to a desired region of a target 114, such as different regions over time. In this example, the light-transmission optical system 112 may be left out depending on an application or may be configured to have a certain divergence angle by using a diffuser. The light-transmission optical system 112 and the optical deflector 113 may be implemented in one component and their order may be reversed. Laser light radiated to a certain region in such a manner enters the target 114 and is reflected.

The laser light reflected from the target 114 passes a fixed optical filter 115 blocking noise light, then passes a fixed light-reception lens 116 for forming a focus and arrives at a wide-area photo detector 117. In this example, the order of the optical filter 115 and the light-reception lens 116 may be reversed and the optical filter 115 is an optional component.

In the present invention, the light-reception unit may include the light-reception lens 116 and the photo detector 117. The fixed light-reception unit collects all or some of laser beams reflected from the target 114. In addition, collected light is detected through a single, wide-area, split-type or array-type photo detector 117. Also, the light-reception unit may further include a module that may control temperature in order to constantly maintain the performance of the photo detector 117 sensitive to the temperature or that may change the performance of a detection module depending on the temperature. The light-reception unit of the present invention may further include at least one light amplifier and a module (such as a RF combiner) that adds the output of each light amplifier. The output of the light amplifier may be provided as one signal through such a module.

The optical deflector (or reflector) 113 may be arranged between light radiated from the pulse laser 111 and the target 114. The optical deflector 113 enables a laser beam radiated from the pulse laser 111 to be emitted to different locations of the target 114 over time.

The laser radar system 110 of the present invention may radiate laser beams from the optical deflector 113 to different locations over time. Thus, the wide-area photo detector 117 may detect light reflected from different locations over time. In addition, the laser radar system 110 may further include a signal reading unit (not shown) that reads a laser beam detected by the wide-area photo detector 117.

Also, the laser radar system of the present invention may further include an image processing unit that uses laser beam information read by the signal reading unit to calculate a distance of each observing point relative to the target 114 or/and intensity information on reflected light and uses a calculated distance relative to each point or/and calculated intensity information on the reflected light to determine a 3D image of the target 114.

The laser radar system of the present invention uses a distance or/and intensity information on reflected light in determining a 3D image. That is, when viewing from the airplane, distance information will be detected that an asphalt road and the ground next thereto have the same height. Thus, in order to determine an accurate 3D image, intensity information on the reflected light may also be used to distinguish a paved road from the ground with different reflectivity.

Also, the laser radar system 110 of the present invention may further include a camera that obtains a 2D image of the target 114. In this case, the image processing unit may also perform the function of correcting or synthesizing a 3D image and the 2D image obtained by the camera.

The light-reception unit may be implemented with a device (such as a TEC, temperature controller) for maintaining the photo detector sensitive to the temperature at a constant temperature so that the photo detector may have the same characteristic. In addition, the laser radar system 110 may further include a signal processing module that may process the time difference of a laser beam reflected from an analog signal generated by the light-reception unit, or the size of a reflected laser beam. Then, a 3D image may be finally formed by an analysis device that transmits and displays data through a connection cable using various communication protocols such as USB and Gigabit Ethernet.

That is, the image processing unit calculates different locations over time, analyzes laser light entering at that time and calculates a distance or/and intensity information on reflected light. A 3D image is obtained by using a calculation result of the distance or/and the intensity information on the reflected light. In this example, although the analysis device for display is described, operations are performed only until a processing board related process and following operations may be performed directly by an actual application (a car and robot that may directly recognize and process a 3D image).

FIG. 2 represents that the optical path of the light transmission unit is different from that of the light reception unit, which is called a dual axis or bi-axis structure. As another example, it will be easily understood that the optical path of the light transmission unit may be the same as that of the light reception unit in the present invention may be implemented (a single axis or uni-axial structure).

Figure 3:
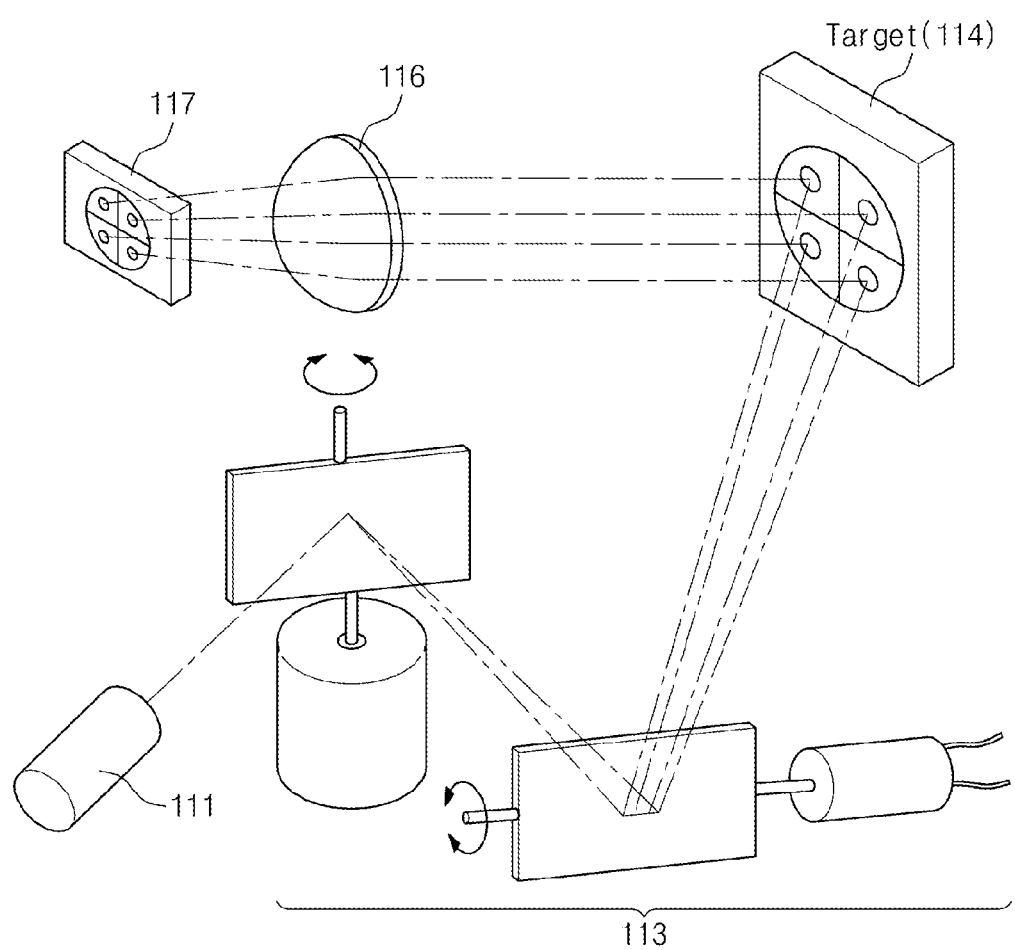
FIG. 3 exemplarily shows how a light transmission unit presented by the present invention radiates light to different locations over time and a fixed light reception unit detects.

FIG. 3 exemplarily shows how a light transmission unit presented by the present invention radiates light to different locations over time and a fixed light reception unit detects. FIG. 3 represents the laser radar system 110 that includes the pulse laser 111, the optical deflector 113, the target 114, the light reception lens 116, and the photo detector 117.

In this example, although the laser radar system performs 1D (linear) scan on the plane in order to show a scanning form, it should be understood as actually scanning the front on a 2D plane. In this case, a scanning pattern may be various such as 2D plane coordinates having the same interval as well as circular coordinates or other coordinates having different intervals. Such a pattern may be implemented by applying a driving signal suitable for an optical scanner and determine the quality of a 3D image. That is, the scanning operation of the present invention does not use a method of spreading and scattering a laser beam but emits each laser beam to each observing point of a target, and when laser beams are emitted to all observing points over time, any region is regularly scanned. In this example, it will be easily understood that an optical scanner may be used with an optical module such as an optical mirror or a beam splitter.

In addition, the light-transmission optical system 112 (such as a collimator) may be further included between the pulse laser 111 and the optical deflector 113 in FIG. 3 and the optical filter 115 may be further included between the target 114 and the light reception lens 116.

In addition, a method of emitting light to different locations of the target 114 over time may be changed or applied through a design change. For example, the optical deflector 113 may use a galvano mirror motor-driven to sequentially output a laser pulse to a plurality of locations of the target 114 over time. Alternatively, the optical deflector 113 may control an optical path by a polygonal rotating mirror motor-driven. Alternatively, the optical deflector 113 may also be implemented by an electro-optic scanner. The electro-optic scanner is a kind of an optical waveguide that controls the direction of incident light by an electrical signal applied to an electrode. Alternatively, the optical deflector 113 may be implemented by using a fiber array laser. The fiber array laser may be implemented as arrayed waveguide grating (AWG). The fiber array laser may light-delay an incident laser beam with the AWG or change the wavelength of the laser beam to radiate light to a target through a plurality of fiber tips that have different directions. Thus, it is possible to perform optical scanning at different wavelengths or at different times. The optical deflector 113 implemented as the electro-optic scanner or the fiber array laser has an advantage in that there is no physical driving unit. Thus, there are advantages in that the optical deflector is resistant to shock and causes little vibration and noise.

The optical deflector 113 of the present invention may be implemented by at least one of a stepping motor, a brushless DC (BLDC) motor, a rotating mirror, an electromagnet-type galvano mirror, an acousto-optic deflector, a two-axis driving scan mirror, a MEMS scanner, and a MEMS reflector. In addition, the optical deflector 113 for 2D scanning may be implemented through a combination of homogeneous or heterogeneous scanners. In addition, the light transmission unit including the light-transmission optical system 112 of the present invention may further include a component for controlling the beam width of a light pulse (hereinafter, referred to as a 'light pulse beam width controller'). The light pulse beam width controller may include a collimator, a beam expander and a lens or include one of them or a combination of two or more of them.

Figure 4:
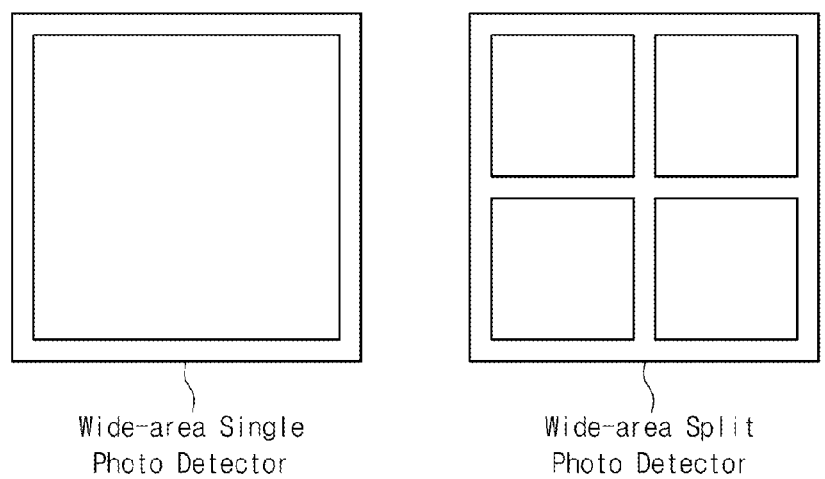
FIG. 4 exemplarily shows a wide-area photo detector of the present invention.

FIG. 4 exemplarily shows a wide-area photo detector of the present invention. Referring to FIG. 4, the photo detector 117 (see FIG. 2) of the present invention may include a single light-reception detection plane or a split light-reception detection plane that includes at least two sections. In this example, although a quadrilateral photo detector is provided as an example, the present invention may implement a photo detector having various shapes such as a hexagonal shape, a circular shape, and an ellipsis shape.

The wide-area photo detector of the present invention is not a single detector having a size of 20 to 50 um that is a diameter of a general optical communication detector, but a detector having a light reception area that may include an optical signal region where a laser pulse signal transmitted by the light transmission unit is reflected by an object and enters through the fixed light reception lens. The wide area in the present invention means a size equal to or larger than 100 um and smaller than 1 mm as an example and may also mean a size equal to or larger than 1 mm in some cases. In other words, it is understood that the wide area in the present invention has a width that may detect most of transmitted optical signals. The reason for this is because the location of a reflected signal entering the light reception unit varies depending on different radiation locations of the light transmission unit over time.

In general, since the width of a laser pulse is several ns and several tens of ns, the operation speed of a photo detector has to increase in order to detect the laser pulse, and when a light reception region widens, the output capacitance of the photo detector increases and thus an operation speed decreases, so there is a limitation in that it is impossible to detect a short laser pulse. In order to overcome such a limitation, the wide-area photo detector may be configured not only in the form of a single photo detector but also in the form of a photo detector having various structures. For example, the wide-area photo detector may be configured as a plurality of unit photo detectors in order to reduce a parasitic capacitance. That is, the wide-area photo detector according to the present invention may also be configured as two or more split photo detectors and each unit pixel gathers to configure one wide-area photo detector.

Since one light pulse may also be reflected from two or more locations, the wide-area photo detector may detect two or more optical signals. It means that two or more 3D point clouds may occur with one light pulse. Thus, the wide-area photo detector according to the present invention may use such a multiple detection function to operate in the dust in the air or under a weather condition such as snow or rain. That is, since laser beams may be reflected from two or more locations in a target in response to one laser beam pulse radiation operation according to the scan operation of the present invention, two or more pieces of coordinate information are generated by detecting the two or more laser beams.

The wide-area photo detector 117 may be implemented in various manners, such as a PN junction photodiode based on silicon, InP or a semiconductor substrate, a PIN photodiode, and an avalanche photo diode (APD).

As such, whereas the present invention uses the wide-area photo detector 117, a photo detector array has typically used. Since an operation is typically performed so that incident light has different time information, each of APDs, photo detectors has different time differences. That is, it is difficult to implement an ROIC in which each pixel has time information and which individually analyzes pixels. On the contrary, time of flight (TOF) on light entering e.g., two APDs is equal in the present invention, there is an advantage in that there is no need for the ROIC and a signal processing module to have complex circuit configurations in order to analyze the TOF.

That is, by using the wide-area photo detector 117 of the present invention, the circuit and processing technique of a signal processing module processing the output of a (single) photo detector may be implemented in the same manner as those of a signal processing module processing the outputs of two or more split photo detectors. However, a process of adding the output of each photo detector (such as a RF combiner) should be added on the assumption that the output of each photo detector is temporally equal. Then, whether a signal comes from a single APD or a plurality of unit APDs is not important and integrated processing may be performed. Thus, even if the present invention uses a typical array APD structure, the present invention needs to implement a signal processing module that is easy to implement a circuit, such as a method of integrating electrical signals coming from each pixel and processing the signals with a single APD. In other words, the split photo detector of the present invention may be understood as including a unit APD, a plurality of unit APDs, and an array APD.

Figure 5:
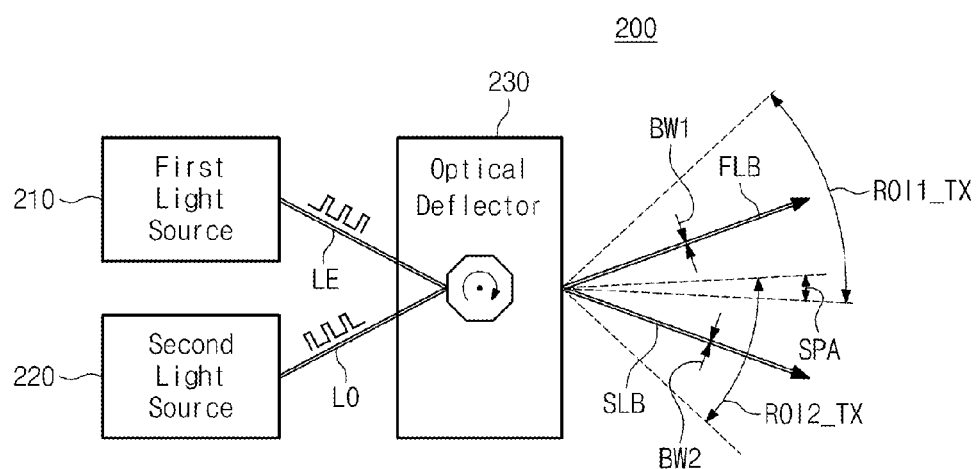
FIG. 5 shows a laser radar system according to another embodiment of the present invention.

FIG. 5 shows a laser radar system according to another embodiment of the present invention. Referring to FIG. 5, a laser radar system 200 may radiate laser beams output at different times to different transmission view ranges ROI_TX through a reflector 230 (or a scanner).

A first light source 210 and a second light source 220 produce and output laser pulses at different time frames. The laser pulses produced by the first light source 210 and the second light source 220 may be exemplarily classified into an even pulse LE and an odd pulse LO. The even pulse LE and the odd pulse LO may be configured so that they have the same cycle but at least one of a pulse location, a pulse width and a pulse intensity is different. Alternatively, it will be easily understood that the even pulse LE and the odd pulse LO may be configured as laser pulses having different cycles. Although not shown, each of the first light source 210 and the second light source 220 may include a laser pulse generator and an optical deflector. Additionally, it is possible to arrange optical modules such as an optical mirror and a beam splitter.

Each of the first light source 210 and the second light source 220 may be implemented to include one or more of a master oscillator power amplifier (MOPA), a diode pumped solid state laser (DPSSL) and an optical integrated modulator. Also, the first light source 210 and the second light source 220 may be configured to have a high pulse repetition frequency (PRF). Each of the first light source 210 and the second light source 220 may use the high PRF to scan different sections and provide a 3D image for a view range (ROI) having a wider angle. Also, when two or more sections are configured for a repetitive region or the same region, the space may ensure a relatively high frame rage compared to other spaces.

In general, in order to scan a QVGA (320×240) image at 30 frame per second (fps), a PRF of at least 230 KHz is needed, which may be easily implemented by using the MOPA. Since a technique of spreading beams to recognize a space among typical techniques needs very high laser pulse power (several mJ/pulse), its PRF is several Hz, but since in the laser radar system according to the present invention, laser pulsed are radiated to a wide area at a time, laser power is much less needed and thus it is possible to produce a high-speed laser pulse having high PRF.

The reflector 230 reflects the event pulse LE and the odd pulse LO provided from the first light source 210 and the second light source 220, at different view angles. The reflector 230 reflects the event pulse LE and radiates the pulse to any one point within a first transmission view range ROI1_TX. Then, the reflector 230 reflects the odd pulse LO and radiates the pulse to any one view point within a second transmission view range ROI2_TX. In addition, from a view point where the reflector 230 rotates by a specific angle, the even pulse LE and the odd pulse LO are sequentially radiated to the first transmission view range ROI1_TX and the second transmission view range ROI2_TX. As such, the first light source 210 and the second light source 220 having different time frames may be scanned to different transmission view ranges ROIs by one reflector 230.

In this example, a method of radiating each of the even pulse LE and the odd pulse LO to different points, the first transmission view range ROI1_TX and the second transmission view range ROI2_TX may vary. For example, it is possible to change a time-dependent radiation angle of the even pulse LE and the odd pulse LO through the control of optical reflectors that the first light source 210 and the second light source 220 include. Alternatively, it is possible to configure the first transmission view range ROI1_TX and the second transmission view range ROI2_TX only by adjusting the location of the reflector 230 without the adjustment of the optical deflectors that the first light source 210 and the second light source 220 include. It is also possible to configure the first transmission view range ROI1_TX and the second transmission view range ROI2_TX by the combined operation of the reflector 230 and the optical deflectors that the first light source 210 and the second light source 220 include.

In this example, a beam width controller for adjusting the beam width BW1 of a laser beam corresponding to the even pulse LE may be further included in the first light source 210. For example, at least one of a collimator, a beam expander and a lens is included in the first light source 210 and will define the beam width BW1 of a laser beam corresponding to the even pulse LE. Likewise, a beam width controller for adjusting the beam width BW2 of a laser beam SLB corresponding to the odd pulse LO may be further included in the second light source 220.

In addition, there may be an overlap region SPA between the first transmission view range ROI1_TX and the second transmission view range ROI2_TX. However, such an overlap region is not an important issue when considering that the event pulse LE and the odd pulse LO are radiated at substantially different time frames. The overlap region SPA may also be minimized through the adjustment of an incident angle of the even pulse LE and the odd pulse LO relative to the reflector 230 or the optical deflectors of the first light source 210 and the second light source 220. In some cases, it is possible to configure so that there is no overlap region, when an invisible section is not an important issue.

The laser radar system 200 above has not shown or described a light reception unit in detail. However, the light reception unit may include first and second light reception units, each including the light reception lens and the photo detector that have been previously described. The first light reception unit will be configured to have a reception view range for receiving the reflected light of the even pulse LE. In addition, the second light reception unit may be set to have a reception view range ROI for receiving reflected light of the odd pulse LO. The reception view ranges configured by the first light reception unit and the second light reception unit may overlap.

In addition, it is also possible to receive the reflected light of the first transmission view range ROI1_TX and the second transmission view range ROI2_TX through one light reception unit. One light reception unit may actually be one photo detector. Alternatively, one light reception unit may also be considered as a photo detector unit that integrates the outputs of two or more photo detectors of a stud type and amplifiers amplifying the output of each of two or more photo detectors.

Figure 6:
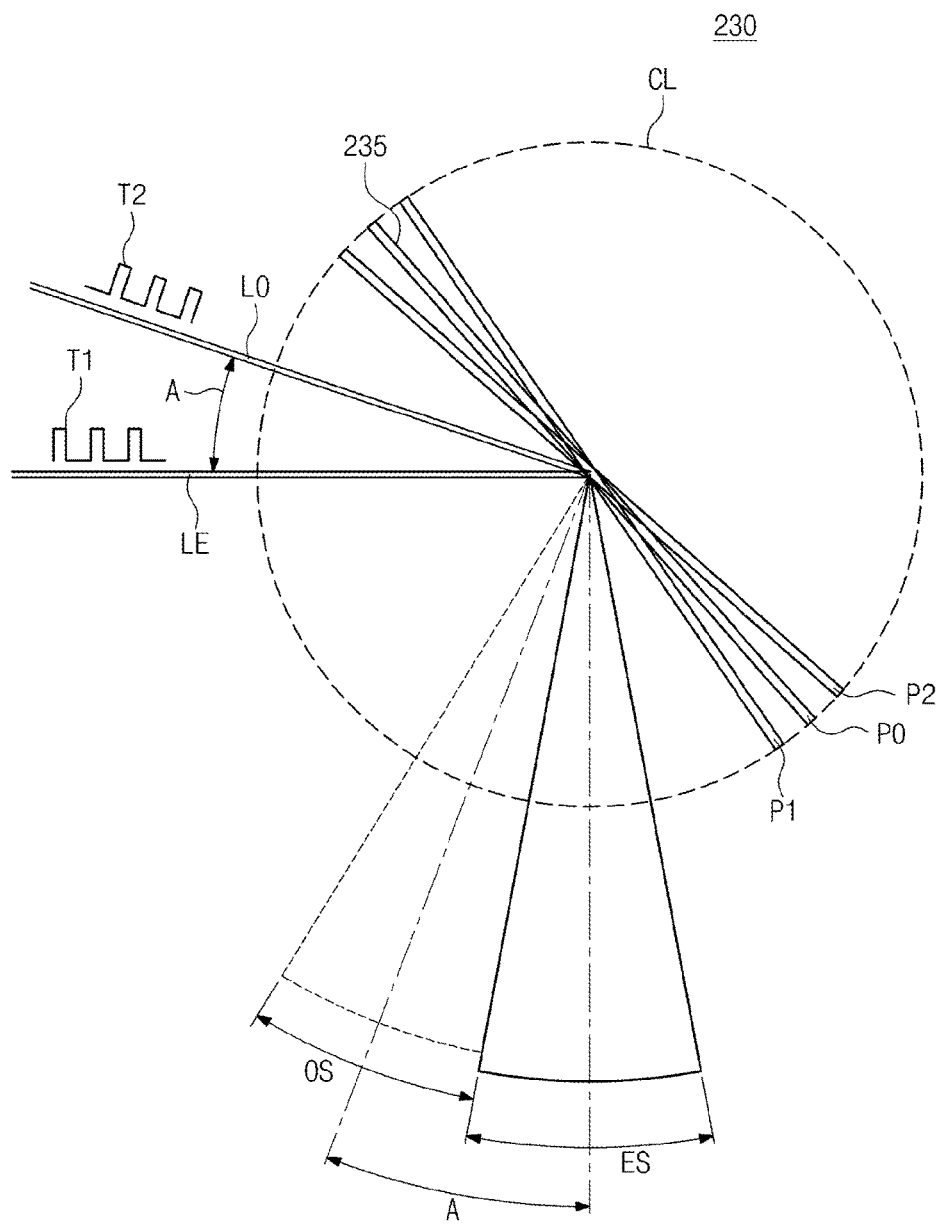
FIG. 6 exemplarily shows a configuration of a reflector of FIG. 5.

FIG. 6 exemplarily shows a configuration of a reflector of FIG. 5. Referring to FIG. 6, the reflector 230 may reflect the even pulse LE and the odd pulse LO entering at different angles to configure transmission view ranges ROIs corresponding to an even section ES and an odd section OS.

The reflector 230 may include a mirror 235 having a reflective plane, for example. The mirror 235 may rotate within a specific angle range around a rotating axis. The even pulse LE and the odd pulse LO may be respectively radiated to the ranges of the even section ES and the odd section OS by the rotation of the mirror 235 over time. The even section ES and the odd section OS may also include or not include the overlap region SPA. However, mutual influence may be ignored by the even pulse LE and the odd pulse LO that are radiated at different times. The even section ES and the odd section OS represent transmission regions. Thus, the even section ES and the odd section OS that represent reception regions will be configured to be more widely than the transmission regions. The incident angle A of the even pulse LE and the odd pulse LO or the rotation angle of the mirror 235 may be controlled so that there is no overlap region SPA in the even section ES and the odd section of the transmission region.

The beams of the event pulse LE and the odd pulse LO enter the reflector 230 with an angle A difference. Even though the mirror 235 configuring the reflector 230 rotates, the beams of the even pulse LE and the odd pulse LO reflected from the reflector 235 will still maintain the angle A when the reflector 230 is a flat mirror. It is actually possible to use a curved mirror as the reflector 230, in which case the angle A may vary depending on a reflected point. When a structure that shares one reflector 230 is used, it is possible to adjust only the incident angle A of the event pulse LE and the odd pulse LO to set up a scan region. Thus, it is possible to simplify a configuration of the light transmission unit of the laser radar system 200 and decrease its volume. Also, when the curved mirror is used as the reflector 230, the ranges of the even section ES and the odd section OS will be able to be set up by the radius of curvature of a mirror.

In this case, the configuration of the light reception unit is not shown but may be easily configured as the wide-area photo detector as described in FIGS. 2 to 4. Thus, a detailed description of the configuration or function of the light reception unit is not provided.

Figure 7:
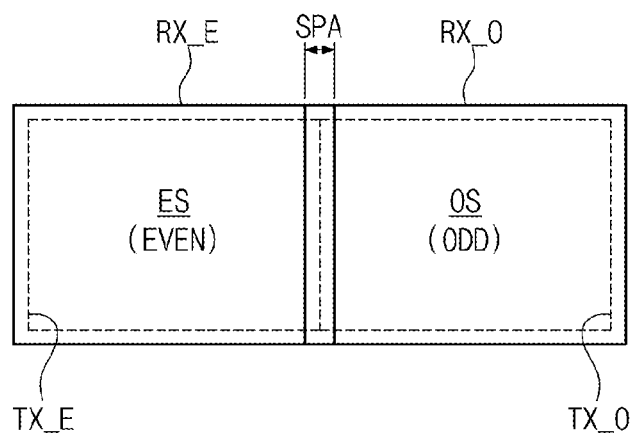
FIG. 7 exemplarily shows a transmission and reception region of a laser radar system 200 in FIG. 6.

FIG. 7 exemplarily shows a transmission and reception region of a laser radar system 200 in FIG. 6. FIG. 7 shows that it is possible to radiate two laser pulses temporally separated to different sections through one scanner and receive reflected light for each section.

A transmission section that represents a range of a region where an even pulse LE is radiated through one or more scanners (or reflectors) may be represented by a section TX_E shown with the broken line on the left side of FIG. 7. In addition, a transmission section that represents a range of a region where an odd pulse LO is radiated through one scanner may be represented by a section TX_O shown with the broken line on the right side of FIG. 7. In this example, the transmission sections TX_E and TX_O are shown not to overlap each other, they may overlap as described previously.

Reception sections that represent the reception regions of reflected light may also overlap each other. A reception section for receiving reflected light for an even pulse LE may be represented by a section RX_E shown with the solid line on the left side of FIG. 7. In addition, a range of a reception region for receiving reflected light for an odd pulse LO may be represented by a section RX_O shown with the solid line on the right side of FIG. 7. In this example, the reception sections RX_E and RX_O may overlap each other. The reason for this is because reflected lights corresponding to the reception sections RX_E and RX_O actually enter a wide-area photo detector at different times.

Figure 8:
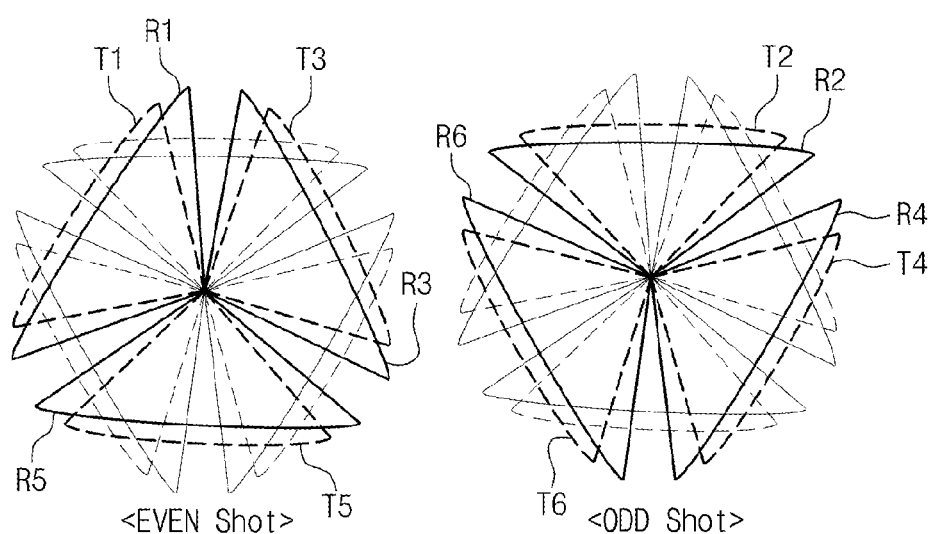
FIG. 8 shows transmission and reception view ranges ROI configured by a laser radar system according to a third embodiment of the present invention.

FIG. 8 shows transmission and reception view ranges ROI configured by a laser radar system according to a third embodiment of the present invention. Referring to FIG. 8, the laser radar system of the present invention may scan 360°. For example, view ranges by the laser radar system according to the third embodiment may include transmission and reception view ranges T1/R1, T3/R3, and T5/R5 configured by an even shot and transmission and reception view ranges T2/R2, T4/R4, and T6/R6 configured by an odd shot. Although the present embodiment describes 360° as an example, the transmission and reception view ranges may be equally configured within an optical angle such as 120°, 180°, and 270°.

Each of the transmission view ranges T1, T3 and T5 configured by the event shot may be configured to perform scanning, maintaining a loader with 120'difference from the center. In addition, the reception view ranges RE R3 and R 5 may also be configured to detect reflected light, maintaining a loader with 120'difference from the center. However, the reception view ranges R1, R3 and R5 may have a wider optical angle than corresponding transmission view ranges T1, T3 and T5. In this example, the transmission and reception view ranges T1/R1 may be configured through one light source, an optical deflector, and a photo detector unit. In this case, each of the transmission and reception view ranges T3/R3 and the transmission and reception view ranges T5/R5 will be able to be configured as a transmission and reception unit that includes one light source, an optical deflector, and a photo detector. In this case, each light source of the transmission and reception units will be controlled to have the same laser pulse phase. That is, the synchronization of pulse lasers produced by each light source of the transmission and reception units that are independently configured will be accompanied.

In a variation, each of the transmission view ranges T1, T3 and T5 will also be able to be configured by splitting laser pulses output from one light source and an optical deflector into three directions by an optical splitter.

The transmission view ranges T2, T4 and T6 configured by the odd shot may be configured on a region rotating 60° from the transmission view ranges T1, T3 and T5, respectively. In addition, each of the reception view ranges R2, R4 and R6 will configure a wider region than each of the transmission view ranges T1, T3 and T5. In this example, each of pairs of transmission and reception view ranges T2/R2, T4/R4, and T6/R6 may be configured by a transmission and reception unit or by splitting one laser pulse by an optical splitter. The pairs of transmission and reception view ranges T2/R2, T4/R4, and T6/R6 corresponding to the same phase may overlap pairs of transmission and reception view ranges T1/R1, T3/R3, and T5/R5 operating on the same phase as described previously. However, it is possible to remove the ambiguity of the location of a detected, reflected signal by allocating the laser pulses of the pairs of transmission and reception view ranges T1/R1, T3/R3, and T5/R5 and the pairs of transmission and reception view ranges T2/R2, T4/R4, and T6/R6 at different time zones.

It is possible to scan 360° without a dead zone by a configuration of the transmission and reception view range configured by the laser radar system of the present invention. In addition, the transmission view ranges T1, T3 and T5 and the transmission view ranges T2, T4 and T6 may be set to have different view angles or may be adjusted to have different search distances. Also, each phase of the transmission view ranges T1, T3 and T5 and each phase of the transmission view ranges T2, T4 and T6 will also be able to be adjusted to any angle, not 120°.

Figure 9:
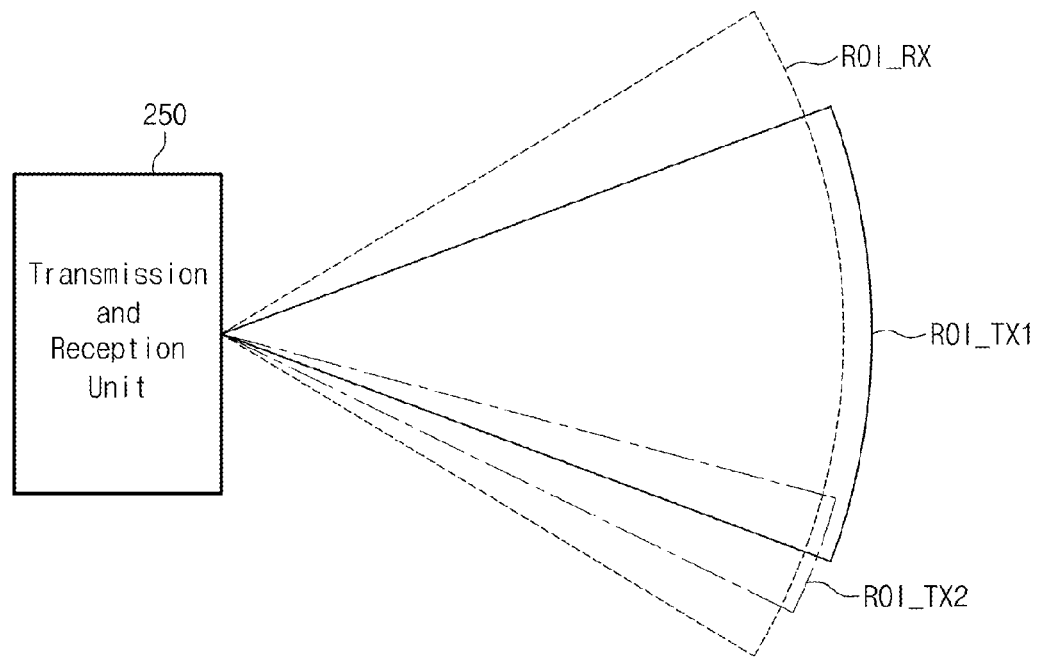
FIG. 9 shows transmission and reception view ranges configured by a laser radar system according to a fourth embodiment of the present invention.

FIG. 9 shows transmission and reception view ranges configured by a laser radar system according to a fourth embodiment of the present invention. Referring to FIG. 9, a transmission and reception unit 250 includes at least two light transmission units radiating laser pulses (for example an event pulse and an odd pulse) at different times, and a light reception unit. A view range by the laser radar system includes a first transmission view range ROI_TX1 and a second transmission view range ROI_TX2 that are configured by an event shot. The first transmission view range ROI_TX1 is configured by a laser pulse corresponding to the event shot. The first transmission view range ROI_TX1 may be configured to have a relatively wide view angle by a first light transmission unit of the transmission and reception unit 250. The second transmission view range ROI_TX2 is configured by an odd shot radiated by a second light transmission unit of the transmission and reception unit 250. The second transmission view range ROI_TX2 may be configured to have a relatively narrow view angle. In addition, the first transmission view range ROI_TX1 and the second transmission view range ROI_TX2 may partially overlap. However, since it is easy to identify a reflected signal by laser pulses radiated at different times, an overlapping view range is never an issue.

The reception view range ROI_RX is configured to be able to cover the first transmission view range ROI_TX1 and the second transmission view range ROI_TX2 through at least one light reception unit. That is, a light reception unit of the transmission and reception unit 250 may receive reflected lights of both the event shot and the odd shot. Since the reflected lights of the even shot and the odd shot are received at different time slots, they may be easily identified. Thus, each detection result of the first transmission view range ROI_TX1 and the second transmission view range ROI_TX2 may also be easily identified.

Figure 10:
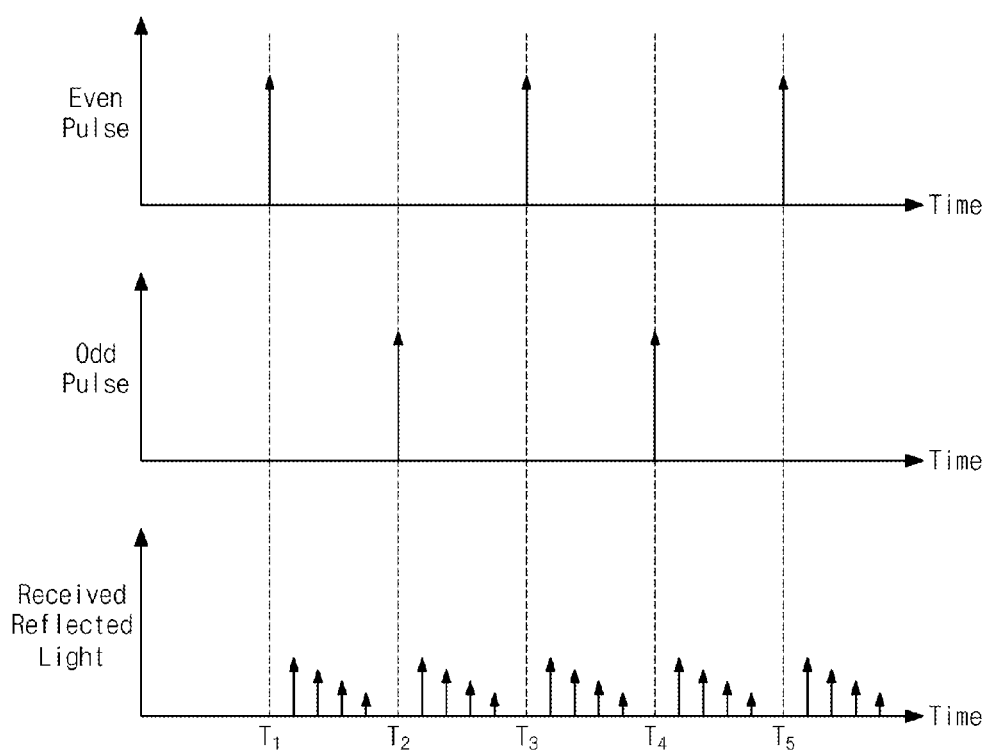
FIG. 10 is a timing diagram exemplarily showing transmission and reception lights of a laser radar system of FIG. 9 in a time domain.

FIG. 10 is a timing diagram exemplarily showing transmission and reception lights of a laser radar system of FIG. 9 in a time domain. Referring to FIG. 10, an even pulse configuring the first transmission view range ROI_TX1, an odd pulse configuring a second transmission view range ROI_TX2, and a reflected light of each transmitted light are exemplarily shown.

The laser beam of the event pulse is radiated to any one point of the first transmission view range ROI_TX1 at each of times T1, T3 or so. On the other hand, the laser beam of the odd pulse is radiated to any one point of the second transmission view range ROI_TX1 at each of times T2, T4 or so. As a result, the first transmission view range ROI_TX1 and the second transmission view range ROI_TX2 are configured by laser beams radiated at different time slots.

In addition, a light reception unit will detect reflected lights that enter at different time slots. For example, reflected lights of an event pulse radiated at time T1 are all reflected before time T2 that the odd pulse is radiated. That is, the size of time slots that are allocated to the event pulse and the odd pulse are provided at a time interval that all reflected lights may be received. Such a configuration of a time slot is equally applied to between times T2 and T3.

Figure 11:
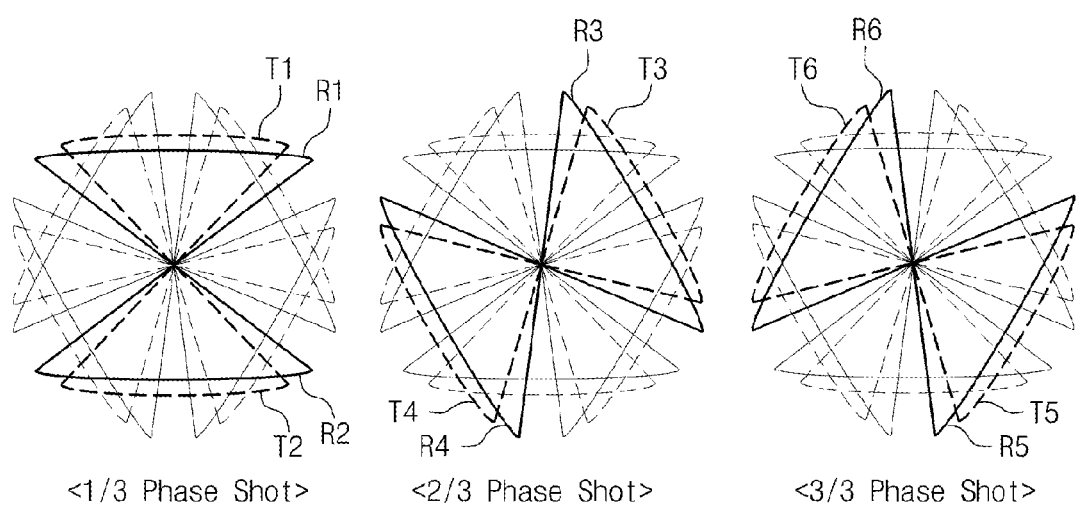
FIG. 11 shows transmission and reception view ranges configured by a laser radar system according to a fifth embodiment of the present invention.

FIG. 11 shows transmission and reception view ranges configured by a laser radar system according to a fifth embodiment of the present invention. Referring to FIG. 11, the laser radar system of the present invention may scan 360° through a laser pulse that has three laser pulses having a phase difference. For example, view ranges by the laser radar system according to the fifth embodiment may include transmission and reception view ranges T1/R1 and T2/R2 configured by a ⅓ phase pulse, transmission and reception view ranges T3/R3 and T4/R4 configured by a ⅔ phase pulse, and transmission and reception view ranges T5/R5 and T6/R6 configured by a 3/3 phase pulse.

In this example, each of the transmission view ranges T1 and T2 may be configured to perform scanning, maintaining a loader with a 180° difference from the center. In addition, the reception view ranges R1 and R2 are also configured in a similar form to corresponding transmission view ranges T1 and T2. In this example, the transmission and reception view ranges T1/R1 configured by the ⅓ phase pulse may be configured through one light source, an optical deflector, and a photo detector unit. In addition, the transmission and reception view ranges T2/R2 configured by the ⅓ phase pulse may be configured through one light source, an optical deflector, and a photo detector unit. Alternatively, each of the transmission view ranges T1 and T2 may also be configured by splitting, the laser pulse having the ⅓ phase output from one light source and an optical deflector, into sections having two directions by an optical splitter. Such a configuration of the transmission and reception unit may also be applied to the transmission and reception view ranges T3/R3 and T2/R4 and the transmission and reception view ranges T5/R5 and T6/R6.

However, the configurations of the laser radar system according to the third to fifth embodiments may be selected and changed by a user depending on the characteristic of a subject to be detected or a loader, and various purposes.

Figure 12:
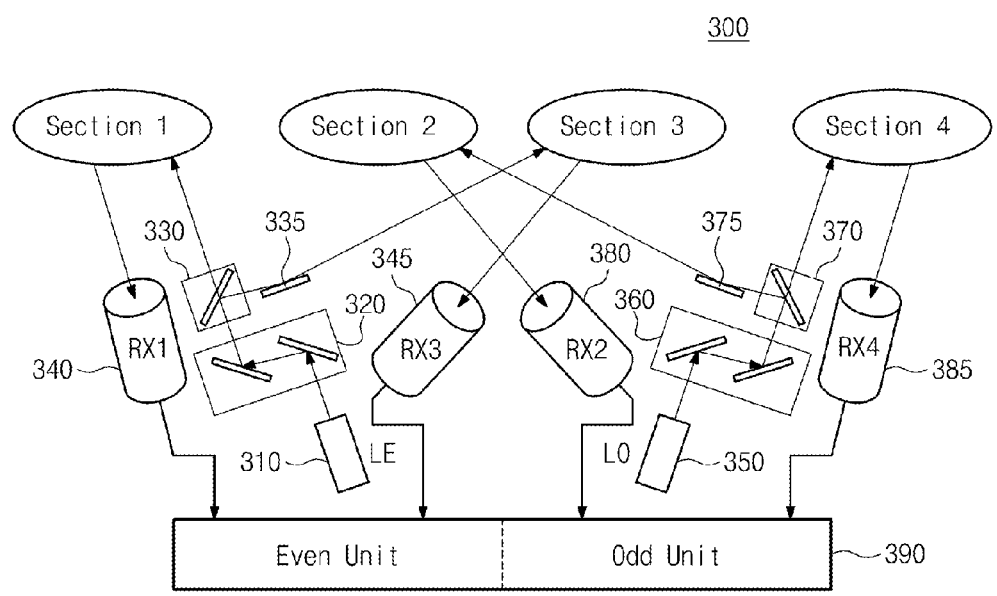
FIG. 12 shows a laser radar system according to a sixth embodiment of the present invention.

FIG. 12 shows a laser radar system according to a sixth embodiment of the present invention. Referring to FIG. 12, a laser radar system 300 shows a structure that shares one scanner but may perform optical detection on a plurality of sections.

A first light source 310 produces an even pulse LE. The even pulse LE produced by the first light source 310 is deflected by an optical deflector and enters an optical splitter 330. One of even pulses LE formed through split by the optical splitter 330 is radiated to a radiation surface corresponding to Section 1. In addition, the other of a plurality of even pulses LE formed through split by the optical splitter 330 is radiated to a region corresponding to Section 3 by a mirror 335. In some cases, the even pulse may also be radiated directly to Section 3 without using the mirror 335 separately.

Reflected light of the even pulse LE radiated to a target of Section 1 is detected by a first light reception unit 340. In addition, reflected light of the even pulse LE radiated to a target of Section 3 is detected by a third light reception unit 345. In this example, each of the first light reception unit 340 and the third light reception unit 345 may include a wide-area photo detector. In addition, each of the first light reception unit 340 and the third light reception unit 345 may further include a light reception lens or an optical filter.

A second light source 350 produces an odd pulse LO. An odd pulse LO produced by the second light source 350 is deflected by an optical deflector 360 and enters an optical splitter 370. One of odd pulses LO formed through split by the optical splitter 370 is radiated to a region corresponding to Section 4. In addition, the other of a plurality of odd pulses LO formed through split by the optical splitter 370 is radiated to a region corresponding to Section 2 by a mirror 375. In addition, the other of the odd pulses LO formed through split by the optical splitter 370 may also be radiated directly to Section 2 without using the mirror 375 separately.

Reflected light of the odd pulse LO radiated to a target of Section 2 is detected by a second light reception unit 380. In addition, reflected light of the odd pulse LO radiated to a target of Section 4 is detected by a fourth light reception unit 385. In this example, each of the second light reception unit 380 and the fourth light reception unit 385 may include a wide-area photo detector. In addition, each of the second light reception unit 380 and the fourth light reception unit 385 may further include a light reception lens or an optical filter.

Signals detected by the first to fourth light reception units 340, 345, 380 and 385 may be processed by a control unit 390 to configure a 3D image. The control unit 390 may be divided into an even unit for processing signals detected by the first light reception unit 340 and the third light reception unit 345 and an odd unit processing signals detected by the second light reception unit 380 and the fourth light reception unit 385. Received light of each section is detected by a wide-area photo detector. In addition, the light may be processed by the control unit 390 as integrated 3D image information on each section based on a radiation time and location information.

A configuration of a laser radar system that configures at least two sections by using a scanner (a light source and an optical deflector) has been described above. However, it will be easily understood that it is also possible to configure at least three sections that do not overlap, by using a scanner. That is, it is possible to radiate a laser pulse at at least three different angles by an optical splitter. Also, the order of sections may vary.

Figure 13:
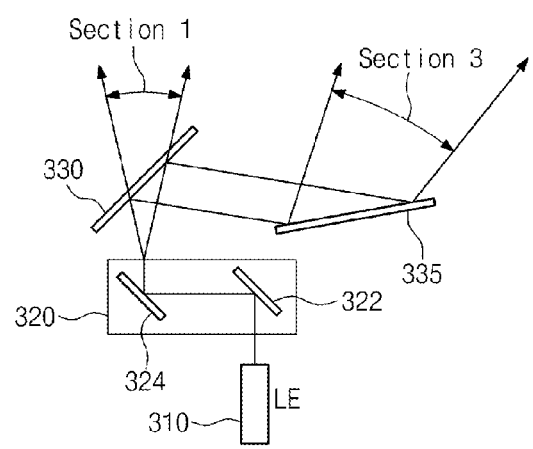
FIG. 13 exemplarily shows a configuration of a light transmission unit that splits a laser pulse in FIG. 12 into at least two beams.

FIG. 13 exemplarily shows a configuration of a light transmission unit that splits a laser pulse in FIG. 12 into at least two beams; Referring to FIG. 13, a light transmission unit that splits and radiates an even pulse LE to different directions includes the first light source 310, the optical deflector 320, the optical splitter 330, and the mirror 335. In this example, the mirror 335 or the optical splitter 330 may be left out.

The first light source 310 may include a pulse laser that produces the even pulse LE. In this example, a laser radar system that has two time frames, an even pulse LE and an odd pulse LO is exemplarily shown but the present invention is not limited thereto. The light transmission unit may also be implemented by time-splitting a laser pulse into three or more time frames and radiating the laser pulse to a plurality of sections.

The optical deflector 320 radiates the even pulse LE produced by the first light source 310 to the optical splitter 330. There may be included a diffuser or collimator for controlling the divergence angle of a produced beam between the optical deflector 320 and the first light source 310. Light output from the optical deflector 320 enters the optical splitter 330.

The optical splitter 330 splits the even pulse LE provided by the optical deflector into two optical paths. The even pulse LE transmitted by the optical splitter 330 is radiated to a region corresponding to Section 1. In addition, the even pulse LE reflected by the optical splitter 330 is again reflected by the mirror 335. The even pulse LE is radiated by the mirror 335 to a region corresponding to Section 3. Thus, one laser beam may be radiated to two or more sections as described. In this example, it will be easily understood that it is possible to radiate one laser beam into three or more sections by including the optical splitter 330 and the mirror 335. As described previously, the mirror 335 or the optical splitter 330 may be left out.

Figure 14:
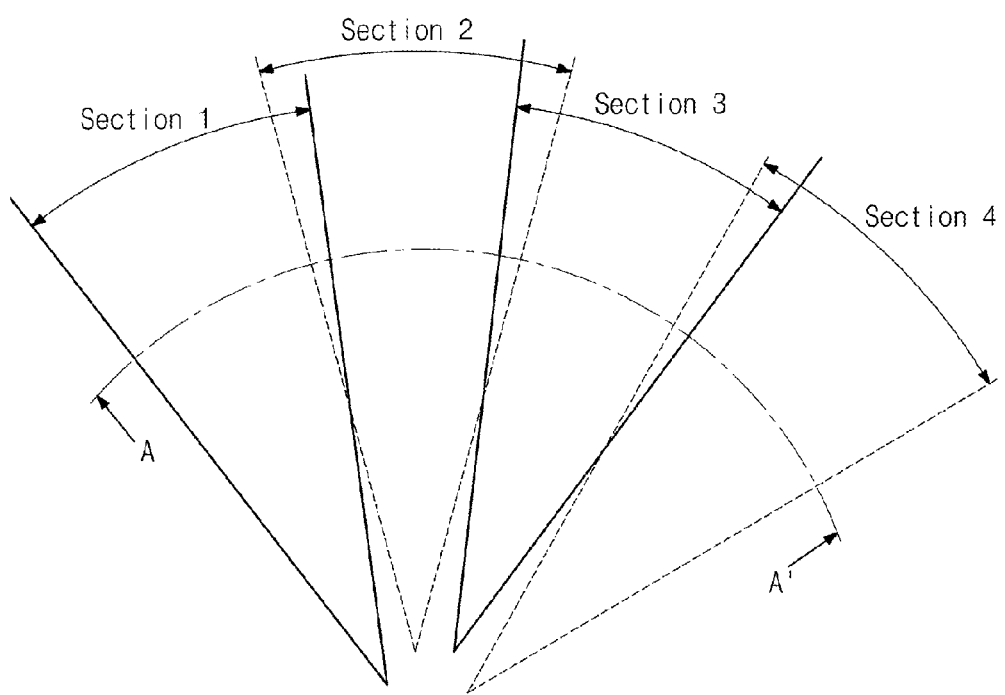
FIG. 14 shows an example of sections sensed by a light reception unit in FIG. 13.

FIG. 14 shows an example of sections sensed by a light reception unit of FIG. 13. Referring to FIG. 14, the forms of Sections 1 to 4 sensed by the first to fourth light reception units 340, 345, 380 and 385 are exemplarily shown.

The first light reception unit 340 and the third light reception unit 345 for receiving reflected light of the even pulse LE radiated by a light transmission unit receive reflected lights corresponding to Sections 1 and 3. In addition, the second light reception unit 380 and the fourth light reception unit 385 for receiving reflected light of the odd pulse LO radiated by the light transmission unit receive reflected lights corresponding to Sections 2 and 4.

In this example, there may be an overlap region on Sections 1 and 2. However, the reflected light of Section 1 is a reflected light of the even pulse LE and the reflected light of Section 2 is a reflected light of the odd pulse LO. Thus, since they are reflected lights of different time frames, influence due to mutual interference may be ignored. Such an overlap region may also be between Sections 2 and 3, and between Sections 3 and 4. However, since adjacent sections have different time frames, there is no problem in the reception performance of a reflected light.

Figure 15:
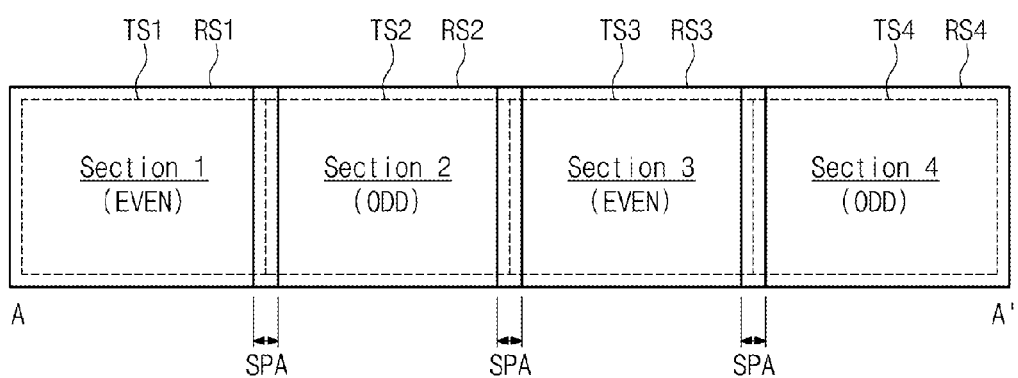
FIG. 15 is a cross sectional view of sections taken along line A-A' of FIG. 14.

FIG. 15 is a cross sectional view of sections taken along line A-A' of FIG. 14. Referring to FIG. 15, since an even pulse and an odd pulse are alternately allocated to sections, there is a spatial overlap region but there is no overlap in time frame.

Section 1 includes a transmission section TS1 and a reception section RS1. The transmission section TS1 is shown by a broken line and the reception section RS1 is represented by a solid line. The transmission section TS1 is configured by the even pulse LE radiated by the light transmission unit shown in FIG. 10 and the reception section RS1 is configured by the light reception unit of FIG. 10. Section 2 includes a transmission section TS2 and a reception section RS2. The transmission section TS2 is shown by a broken line and the reception section RS2 is represented by a solid line. In this example, although the transmission sections TS1 and TS2 are represented not to overlap, overlap may be a method of removing a non-detection section in an actual application. However, even if the transmission sections TS1 and TS2 overlap, there is no big problem because beams may be radiated at different time frames and reflected lights may be received. In addition, even though the reception sections RS1 and RS2 overlap each other, the reception time of a reflected light received by a photo detector varies because the reception time of the reflected light is different. Thus, even though adjacent reception sections are overlap, identification is possible because laser pulses having different time frames are received.

The above relationship between Sections 1 and 2 may be equally applied to those between Sections 2 and 3 and between Sections 3 and 4. A configuration of a plurality of scan regions in a laser radar system that operates with such two time frames has been exemplarily discussed. However, it is also possible to configure the arrangements of the light transmission unit and the light reception unit 2-dimensionally, not linearly, it is possible to set the number of time frames to three or more, and it is possible to set the shape of a section to a square, a regular hexagon or various shapes.

Figure 16:
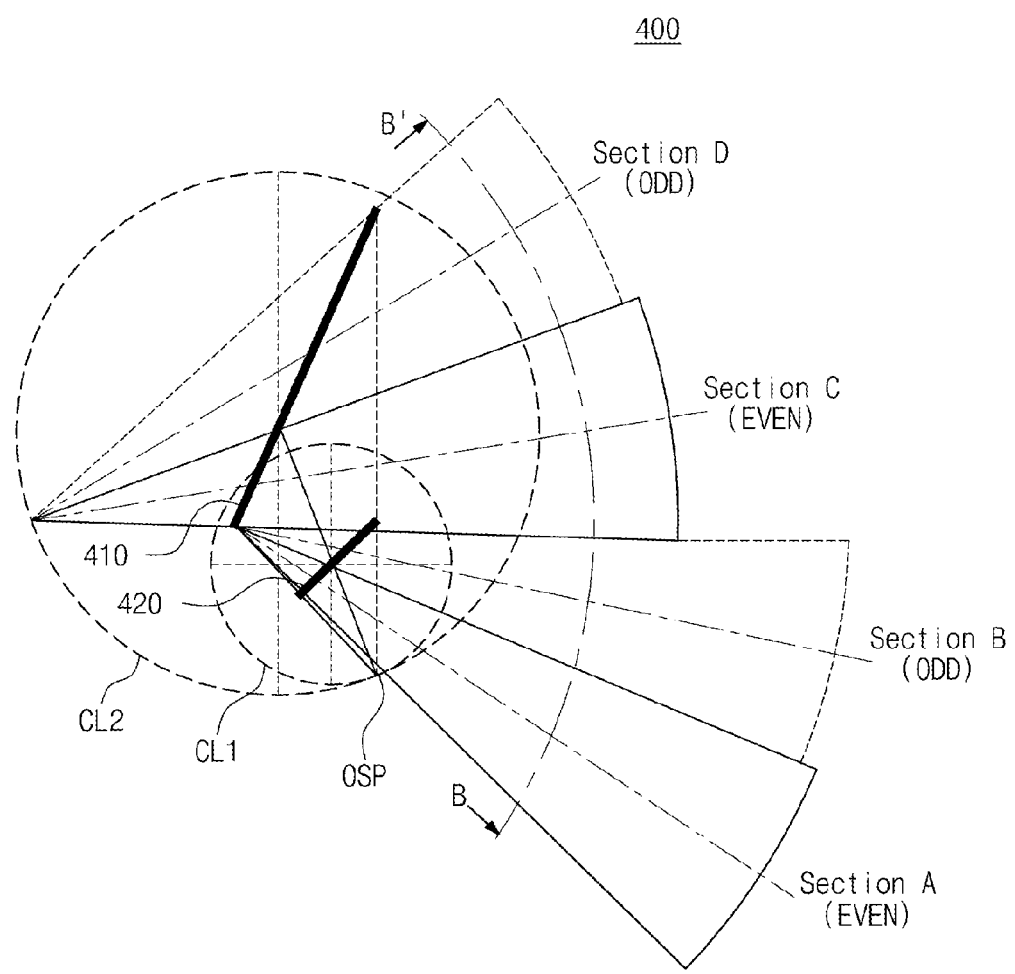
FIG. 16 shows another embodiment of a light transmission unit of a laser radar system.

FIG. 16 shows another embodiment of a light transmission unit of a laser radar system. Referring to FIG. 16, an even pulse LE and an odd pulse LO radiated from an optical start point OSP may be split by optical splitters 410 and 420 into four sections having two time frames. Although a mirror is not arranged in this example, it may be used to further change an optical path.

The even pulse LE and the odd pulse LO output from the optical start point OSP toward the center of a circle CL1 or a circle CL2 are reflected or transmitted from the optical splitter 420. Section A is configured by an even pulse EVEN reflected from the optical splitter 420. In addition, Section B is configured by an odd pulse ODD reflected from the optical splitter 420. In this example, it will be easily understood that Sections A and B may have a mutual overlap region.

The even pulse EVEN and the odd pulse ODD transmitted from the optical splitter 420 are reflected by the optical splitter 410. Section A is configured by an even pulse EVEN reflected from the optical splitter 410. In addition, Section D is configured by an odd pulse ODD reflected from the optical splitter 410. In this example, it will be easily understood that there may be mutual overlap regions between Sections B and C and between Sections C and D.

Figure 17:
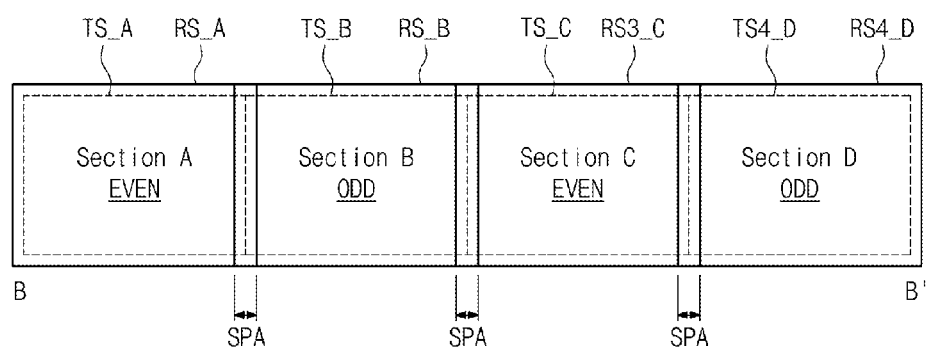

FIG. 17 is a cross sectional view of sections taken along line B-B' of FIG. 16. Referring to FIG. 17, since an even pulse EVEN and an odd pulse ODD are alternately allocated to sections, there is a spatial overlap region but there is no overlap in time frame.

Section 1 includes a transmission section TS_A and a reception section RS_A. The transmission section TS_A is shown by a broken line and the reception section RS_A is represented by a solid line. The transmission section TS_A is configured by an even pulse LE radiated by a light transmission unit and the reception section RS_A is configured by the setting of a light reception unit. Section B includes a transmission section TS_B and a reception section RS_B. The transmission section TS_B is shown by a broken line and the reception section RS_B is represented by a solid line. In this example, the transmission sections TS_A and TS_B may be set not to overlap. However, even if the transmission sections TS_A and TS_B overlap, there is no big problem because beams may be radiated at different time frames and reflected lights may be received. In addition, even though the reception sections RS_A and RS_B overlap each other, the reception time of a reflected light received by a photo detector varies because the reception time of the reflected light is different. Thus, even though adjacent reception sections are overlap, identification is possible because laser pulses having different time frames are received.

In order to completely remove a detection region, overlap may be applied. The relationship between Sections A and B may be equally applied to those between Sections B and C and between Sections C and D. A configuration of a plurality of scan regions in a laser radar system that operates with such two time frames has been exemplarily discussed. However, it is also possible to configure the arrangements of the light transmission unit and the light reception unit 2-dimensionally, not linearly, it is possible to set the number of time frames to three or more, and it is possible to set the shape of a section to a square, a regular hexagon or various shapes.

Figure 18A:
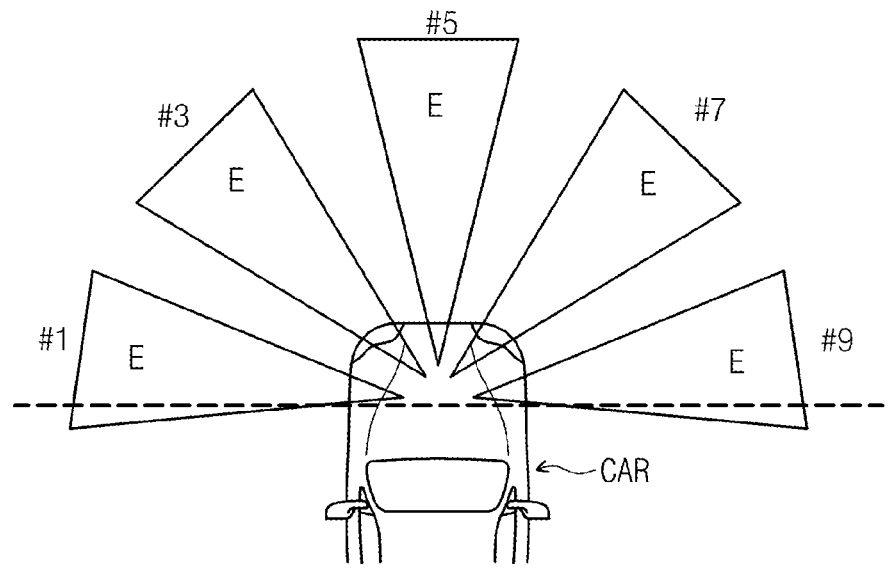
FIGS. 18A and 18B show multi-session operation when a laser radar system of the present invention is applied to an application for a car.
Figure 18B:
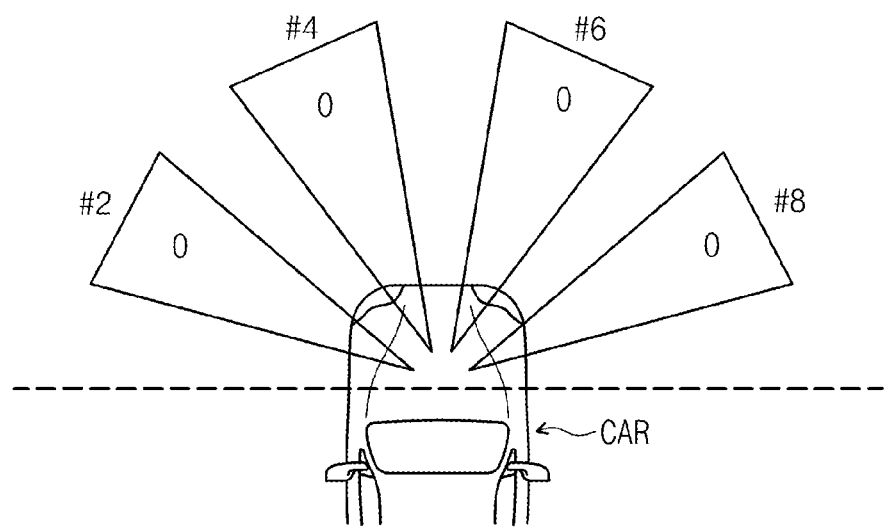

FIGS. 18A and 18B show a multi-session operation when a laser radar system of the present invention is applied to a car application.

Referring to FIG. 18A, the laser radar system may radiate even pulses to five regions and receive a reflected light of each region. In this example, the laser radar system may be implemented through splitting an even pulse into five sections by using an optical splitter or through five individual pulse lasers having the same time frame. In this example, although the detection distance and viewing angle of each section are equally shown, the present invention is not limited thereto. Each of Sections #1, #3, #5, #7, and #9 may be adjusted to have different detection distances and viewing angles. That is, each of Sections #1, #3, #5, #7, and #9 may have the same or different view ranges ROI.

Referring to FIG. 18B, the laser radar system may radiate odd pulses to four regions and receive a reflected light of each region. In this example, the laser radar system may be implemented through splitting an odd pulse into four sections by using an optical splitter or through four individual pulse lasers having the same time frame. In this example, each of Sections #2, #4, #6, and #8 may have the same or different view ranges ROI. The numbers of sections shown in FIGS. 18A and 18B are five and four, respectively. However, the present invention is not limited thereto and one of these may be configured as single or another number of sections.

Figure 19A:
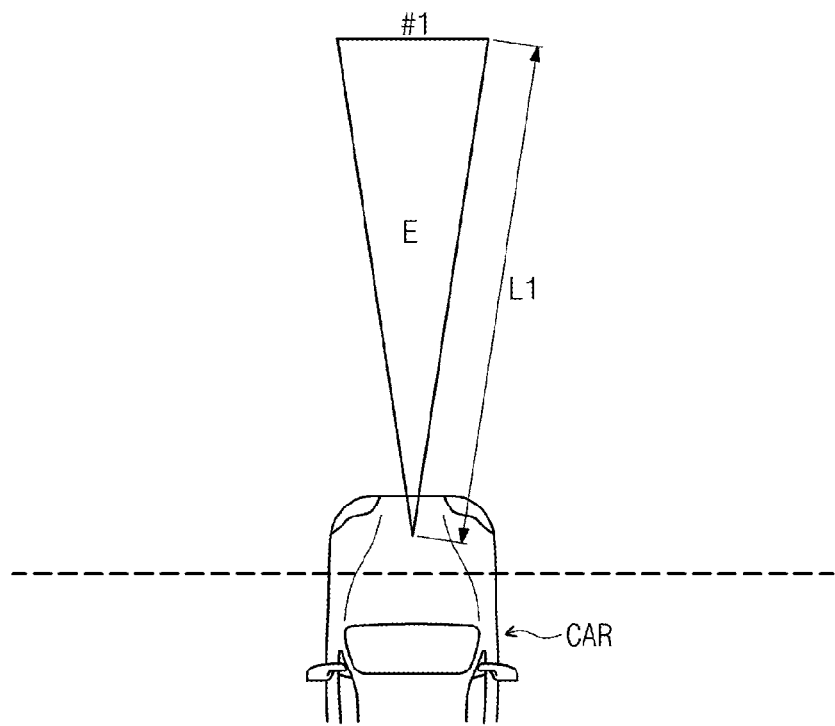
FIGS. 19A and 19B show multi-session operation when a laser radar system of the present invention is applied to an application for a car according to another embodiment.
Figure 19B:
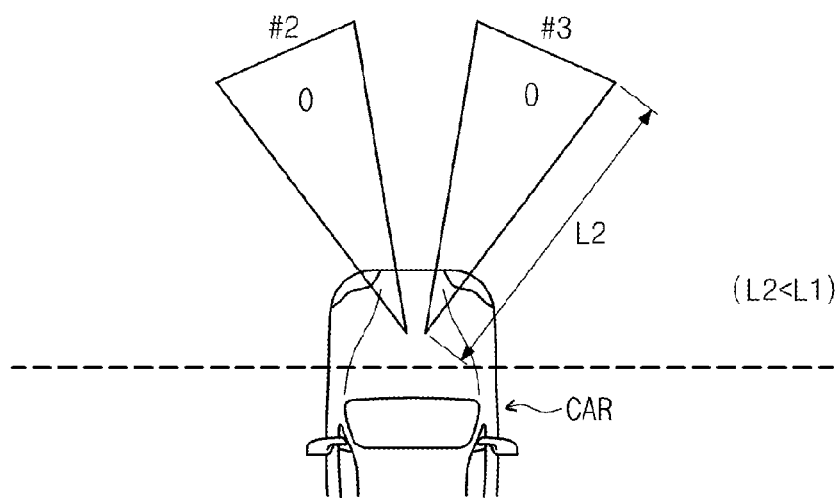

FIGS. 19A and 19B show a multi-session operation when a laser radar system of the present invention is applied to a car application according to another embodiment.

Referring to FIG. 19A, the laser radar system may radiate an even pulse forward to Section #1 and receive a reflected light from the section. In this example, since the laser radar system searches for in the running direction of a car, it is possible to configure Section #1 with a relatively long, narrow view range. Section #1 corresponding to an even pulse may be set to detect a target having a relatively narrow viewing angle and a long distance L1.

Referring to FIG. 19B, the laser radar system may configure a region radiating an odd pulse as Sections #2 and #3. Each of Sections #2 and #3 may be configured to have a view range ROI having a relatively wide viewing angle and short distance L2 compared to Section #1. In this example, although FIGS. 19A and 19B show that they include one and two sections, respectively, the number of sections may vary.

Figure 20:
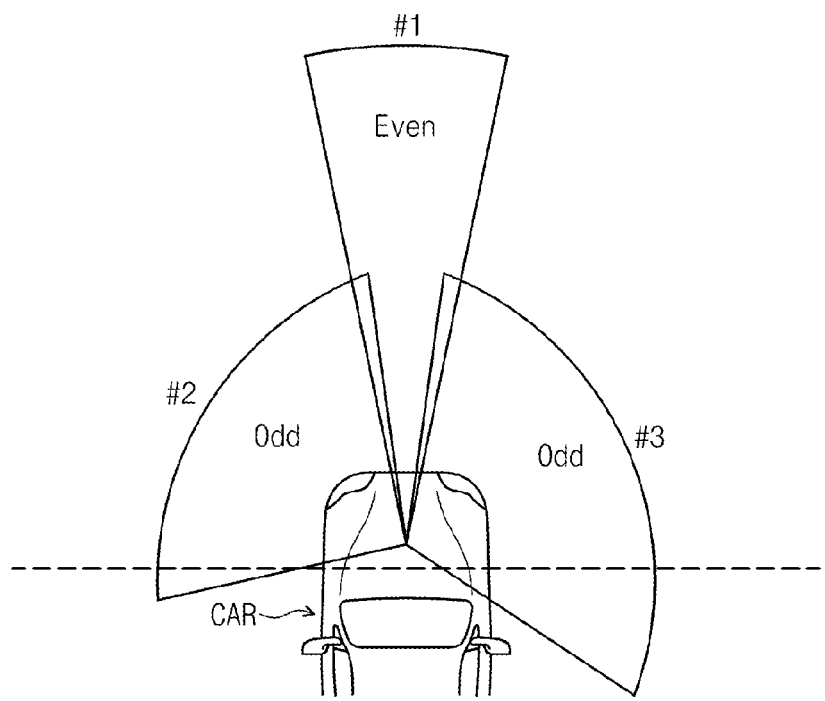
FIG. 20 shows another embodiment where a laser radar system of the present invention is applied to an application for a car.

FIG. 20 shows another embodiment where a laser radar system of the present invention is applied to a vehicle application. Referring to FIG. 20, the laser radar system is configured to allocate an even pulse to a section and allocate even pulses to two sections.

The laser radar system may transmit an even pulse to Section #1 and receive a reflected light thereof. Since Section #1 is a zone for scanning the running direction of a car, it may be configured to have a relatively narrow viewing angle and detect a target having a relatively long distance.

The laser radar system may radiate odd pulses to Sections #2 and #3 and receive a reflected light of each region. In this example, the laser radar system may use an odd pulse produced with a pulse laser to split the odd pulse into two sections. Alternatively, the laser radar system may produce two individual pulse lasers having the same time frame to radiate the pulse lasers to Sections #2 and #3.

In this example, each of Sections #2 and #3 may have the same or different view ranges ROI. In FIG. 20, the viewing angle of Section #3 is shown to be greater than that of Section #2. That is, it is possible to configure Sections #2 and #3 corresponding to an odd pulse in order to provide, Section #3 where a driver is difficult to secure a visual field, with a relatively wider view range ROI. Furthermore, it will be easily understood that Sections TS1 #2 and #3 may be configured as one section.

Figure 21:
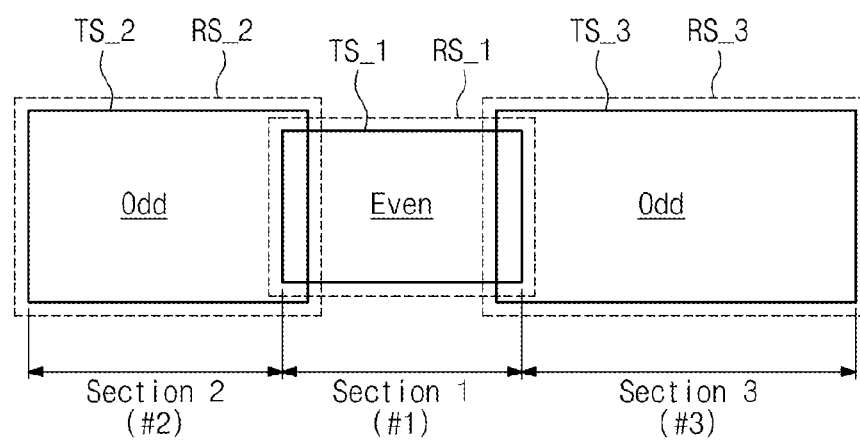
FIG. 21 simply shows cross sections of sections in FIG. 20.

FIG. 21 simply shows cross sections of sections in FIG. 20. Referring to FIG. 21, Section #1 corresponding to an even pulse Even is arranged between
Sections TS1 #2 and #3 corresponding to odd pulses Odd. As described previously, even though there is a spatial overlap region between Sections #1 and #2 or between Sections #1 and #3, there is no overlap in time frame.

Section #1 includes a transmission section TS_1 and a reception section RS_1. The transmission section TS_1 is shown by a solid line and the reception section RS_1 is represented by a broken line. The transmission section TS_1 is configured by an even pulse radiated from a light transmission unit and the reception section RS_1 is configured by a light reception unit. Section #2 includes a transmission section TS_2 and a reception section RS_2. The transmission section TS_2 is shown by a solid line and the reception section RS_2 is represented by a broken line. In this example, the transmission sections TS_1 and TS_2 are represented as having an overlap region. However, even though the transmission sections TS_1 and TS_2 overlap, there is no big problem because beams may be radiated at different time frames and reflected lights may be received. In addition, even though the reception sections RS_1 and RS_2 overlap each other, the reception time of a reflected light received by a photo detector varies because the reception time of the reflected light is different. Thus, even though adjacent reception sections are overlap, identification is possible because laser pulses having different time frames are received.

The relationship between Sections #1 and #2 may be equally applied to that between Sections #1 and #3. However, the viewing angle of Section #3 may be configured to be relatively wider compared to that of Section #2, as described previously. A configuration of a plurality of scan regions in a laser radar system that operates with such two time frames has been exemplarily discussed. However, it is also possible to configure the arrangements of the light transmission unit and the light reception unit 2-dimensionally, not linearly, it is possible to set the number of time frames to three or more, and it is possible to set the shape of a section to a square, a regular hexagon or various shapes.

Figure 22:
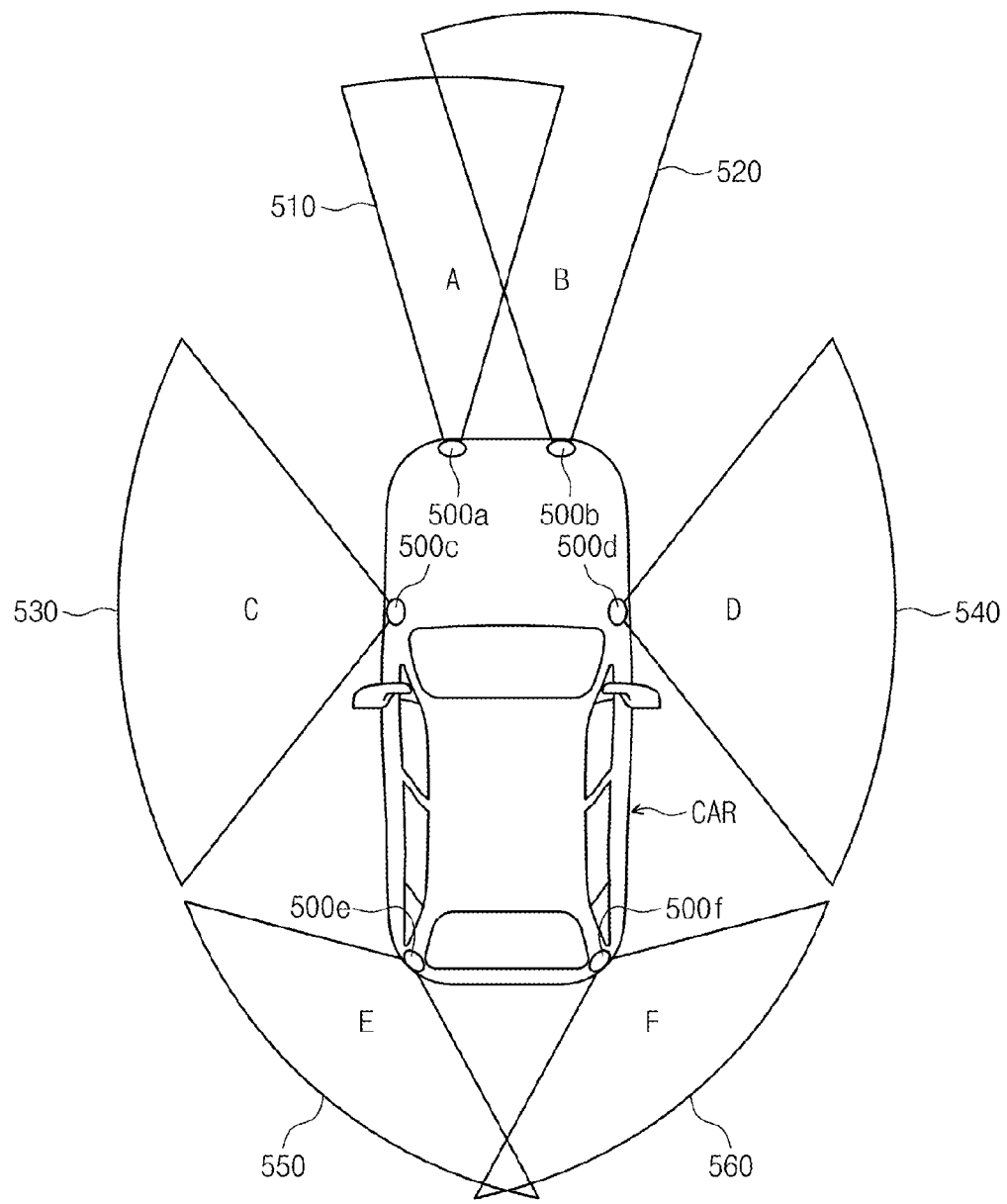
FIG. 22 shows how to configure sections according to another embodiment of a laser radar system for a car.

FIG. 22 shows how to configure sections according to another embodiment of a laser radar system for a car. Referring to FIG. 22, sections that the transmission and reception units of a laser radar system are in charge may be configured to have various view ranges ROI depending on the location.

For example, two transmission reception units 500a and 500b may be installed at the front corresponding to the running direction of a car. In addition, transmission and reception units 500c and 500d may be installed on both sides of the car, respectively. In addition, transmission and reception units 500e and 500f may be installed on both sides at the back of the car, respectively.

The two transmission and reception units 500a and 500b installed at the front may use laser pulses A and B having different time frames to scan a target. Moreover, sections 510 and 520 that the two transmission and reception units 500a and 500b configure may be configured to have different view ranges ROI.

The two transmission and reception units 500c and 500d installed on both sides may use laser pulses C and D having the same or different time frames to scan a target. The view ranges ROI of sections that the transmission and reception units 500c and 500d installed on both sides configure may have a relatively shorter distance and wider viewing angle than those of the front.

Also, the transmission and reception units 500e and 500f that are in charge of the back or both sides at the back may use laser pulses E and F having the same or different time frames to scan a target. The view ranges ROI of sections that the transmission and reception units 500c and 500d installed on both sides configure may have a relatively shorter distance and wider viewing angle than those of the front.

According to a laser radar system of the present invention, it is possible to provide a 3D image of various locations and view ranges depending on the characteristic of a loader.

According to a laser radar system of the present invention, it is possible to simultaneously search for a wide region because it is possible to implement a plurality of radiation ranges through a combination of a light transmission unit.

Also, a laser radar system of the present invention may decrease or remove a dead zone where it is not visible due to the hood of a car or a portion of a system, in implementing the car or various application systems.

Also, a laser radar system of the present invention includes at least one light reception lens that has different optical angle characteristics, it is possible to simultaneously obtain long-distance data of a high SNR mode for a relatively narrow angle and a 3D image of a low SNR mode for a relatively low angle.

Also, a laser radar system of the present invention may provide a simple structure that may process a signal received through at least one light reception unit, by a signal processing module. Thus, a laser radar system of the present invention is very advantageous in an implementation cost aspect.

Also, by providing a laser radar system that uses one or more light transmission units operating at different time zones, it is possible to implement a system that scans a wider area, efficiently removes a dead zone and provides different resolutions for each region as needed.

Exemplary embodiments of the present invention have been discussed so far. It will be understood by a person skilled in the art that various changes in form and details may be made therein without departing from the spirit and scope of the invention. Therefore, the disclosed embodiments should be considered in descriptive sense only and not for purposes of limitation. The scope of the invention is defined not by the detailed description of the invention but by the appended claims, and all differences within the scope will be construed as being included in the present invention.

It is obvious to a person skilled in the art that the structure of the present invention may be variously modified or changed without departing from the scope or technical spirit of the present invention. When considering the descriptions above, it is considered that the present invention includes changes and modifications of the present invention if they are within the scopes of the following claims and their equivalents.

What is claimed is:

1. A laser radar system installed on a vehicle comprising:
   a first transmission and reception unit sequentially radiating a first laser beam to a first plurality of locations outside the vehicle and within a first view range and receiving reflected light of the first laser beam reflected from the first plurality of locations outside the vehicle; and
   a second transmission and reception unit sequentially radiating a second laser beam to a second plurality of locations outside the vehicle and within a second view range and receiving reflected light of the second laser beam reflected from the second plurality of locations outside the vehicle,
   wherein the first transmission and reception unit scans the first view range,
   the second transmission and reception unit scans the second view range, each transmitting optical path of the laser beam radiated from the first transmission and reception unit to each of the first plurality of locations is different from each receiving optical path of the reflected light from each of the first plurality of locations to the first transmission and reception unit, so that each transmitting optical path and each receiving optical path constitute a bi-axis beam structure, and wherein the first laser beam and the second laser beam are radiated during different time slots, such that pulses of the first laser beam are interleaved with pulses of the second laser beam.

2. The laser radar system of claim 1, wherein:
the first transmission and reception unit comprises
a first light source producing the first laser beam,
a first reflector deflecting the first laser beam output from the first light source to radiate the first laser beam to the first view range, and
a first light reception unit receiving the reflected light of the first laser beam through reflection of the first laser beam from a target; and the second transmission and reception unit comprises
a second light source producing the second laser beam,
a second reflector deflecting the second laser beam output from the second light source to radiate the second laser beam to the second view range, and
a second light reception unit receiving the reflected light of the second laser beam through reflection of the second laser beam from a target.

3. The laser radar system of claim 2, wherein each of the first light reception unit and the second light reception unit comprise a photo detector outputting a detection signal for a received, reflected light,
the photo detector comprising at least one of a single photo detector, an array-type photo detector, a wide-area photo detector, and a split-type photo detector.

4. The laser radar system of claim 2, wherein the first light source and the second light source are separate light sources, and
the first reflector and the second reflector are a same reflector that radiates the first and second laser beams to the first and second plurality of locations, respectively, within the first and second view ranges.

5. The laser radar system of claim 2, wherein the first light reception unit and the second light reception unit define a shared light reception unit that receives the reflected light of the first and second laser beams respectively from the first and second view ranges.

6. The laser radar system of claim 1, wherein the first view range comprises a first transmission view range to which the first laser beam is sequentially radiated, and
the second view range comprises a second transmission view range to which the second laser beam is sequentially radiated.

7. The laser radar system of claim 6, wherein the first view range comprises a first reception view range in which the reflected light of the first laser beam is received, and
the second view range comprises a second reception view range in which the reflected light of the second laser beam is received.

8. The laser radar system of claim 1, further comprising:
a control unit synthesizing three-dimensional (3D) image coordinates or reflection image information with reference to a detection signal sequentially output according to the detection of the reflected light by the first transmission and reception unit and the second transmission and reception unit, and a reflection time or reflection intensity detected.

9. The laser radar system of claim 8, wherein the control unit controls at least one of the first and second view ranges, a scan speed, a number of points to be scanned, and laser power, based on a moving direction, a moving angle, a moving speed of the vehicle, moving information, information on weather around the vehicle, dust, and the locations of the first and second transmission and reception units on the vehicle.

10. The laser radar system of claim 1, further comprising:
a first optical splitter radiating the first laser beam to the first plurality of locations within the first view range, and radiating the first laser beam to a third plurality of locations within a third view range that does not overlap the first view range.

11. The laser radar system of claim 10, further comprising:
a second optical splitter radiating the second laser beam to the second plurality of locations within the second view range, and radiating the second laser beam to a fourth plurality of locations within a fourth view range that does not overlap the second view range.

12. The laser radar system of claim 11, further comprising:
at least one of a first reflective mirror reflecting the first laser beam split by the first optical splitter to the third plurality of locations within the third view range, and
a second reflective mirror reflecting the second laser beam split by the second optical splitter to the fourth plurality of locations within the fourth view range.

13. The laser radar system of claim 12, wherein
the first view range and the second view range overlap,
the second view range and the third view range overlap, and
the third view range and the fourth view range overlap.

14. The laser radar system of claim 1, further comprising:
a third transmission and reception unit radiating a third laser beam to a third view range and receiving reflected light of the third laser beam,
wherein the third laser beam and the first laser beam are radiated during different time slots when the third view range and the first view range overlap, and
the third laser beam and the second laser beam are radiated during different time slots when the third view and the second view range overlap.

15. The laser radar system of claim 1, wherein the first view range and the second view range are set to be different in detection distance or detection angle.

16. The laser radar system of claim 1, wherein the first view range and the second view range have a horizontally asymmetrical or non-circular shape, and are located adjacent to the vehicle.

17. The laser radar system of claim 1, wherein a view range corresponding to the front of the vehicle comprising at least one of the first view range and the second view range, the view range corresponding to the front of the vehicle being longer in detection distance or narrower in detection angle, when compared to a view range that corresponds to the back or side of the vehicle.

18. The laser radar system of claim 1, wherein the control unit uses detection information obtained from at least one of the first and second transmission and reception units to perform simultaneous localization and mapping (SLAM).

19. The laser radar system of claim 1, wherein the first view range and the second view range overlap.

20. A laser radar system installed on a vehicle comprising:
a first transmission and reception unit sequentially radiating a first laser beam to a first plurality of locations outside the vehicle and within a first view range and receiving reflected light of the first laser beam reflected from the first plurality of locations outside the vehicle;
a second transmission and reception unit sequentially radiating a second laser beam to a second plurality of locations outside the vehicle and within a second view range and receiving reflected light of the second laser beam reflected from the second plurality of locations outside the vehicle; and
a first optical splitter radiating the first laser beam to the first plurality of locations within the first view range, and radiating the first laser beam to a third plurality of locations within a third view range that does not overlap the first view range,
wherein the first transmission and reception unit scans the first view range,
the second transmission and reception unit scans the second view range, and
each transmitting optical path of the laser beam radiated from the first transmission and reception unit to each of the first plurality of locations is different from each receiving optical path of the reflected light from each of the first plurality of locations to the first transmission and reception unit, so that each transmitting optical path and each receiving optical path constitute a bi-axis beam structure.

* * * * *